US008801556B2

(12) United States Patent
Kato

(10) Patent No.: US 8,801,556 B2
(45) Date of Patent: *Aug. 12, 2014

(54) POWER TRANSMITTING DEVICE

(75) Inventor: Tadahiko Kato, Kosai (JP)

(73) Assignee: Univance Corporation, Shizuoka (JP)

( * ) Notice: Subject to any disclaimer, the term of this patent is extended or adjusted under 35 U.S.C. 154(b) by 337 days.

This patent is subject to a terminal disclaimer.

(21) Appl. No.: 13/376,074

(22) PCT Filed: Jun. 14, 2010

(86) PCT No.: PCT/JP2010/060063
§ 371 (c)(1),
(2), (4) Date: Dec. 2, 2011

(87) PCT Pub. No.: WO2010/143740
PCT Pub. Date: Dec. 16, 2010

(65) Prior Publication Data
US 2012/0071295 A1     Mar. 22, 2012

(30) Foreign Application Priority Data
Jun. 12, 2009 (JP) ................................. 2009-140753

(51) Int. Cl.
| *F16H 3/72* | (2006.01) |
| *F16H 37/06* | (2006.01) |
| *B60K 6/383* | (2007.10) |
| *B60W 30/19* | (2012.01) |
| *F16D 41/07* | (2006.01) |
| *B60K 6/48* | (2007.10) |
| *B60K 6/547* | (2007.10) |
| *F16H 3/12* | (2006.01) |
| *B60W 20/00* | (2006.01) |
| *F16H 3/10* | (2006.01) |

(52) U.S. Cl.
CPC ................. *B60K 6/383* (2013.01); *F16H 3/126* (2013.01); *B60W 20/00* (2013.01); *B60W 30/19* (2013.01); *F16D 41/07* (2013.01); *Y02T 10/6221* (2013.01); *B60K 6/48* (2013.01); *F16H 2306/44* (2013.01); *B60K 6/547* (2013.01); *F16H 3/10* (2013.01)
USPC ............................................................ 475/5

(58) Field of Classification Search
USPC ............... 475/1, 4, 8, 12, 198, 207, 296, 297, 475/317, 318; 74/330, 331; 903/909, 910
See application file for complete search history.

(56) References Cited

U.S. PATENT DOCUMENTS

| 8,152,669 B2* | 4/2012 | Maguire et al. ................... 475/5 |
| 8,454,466 B2* | 6/2013 | Samie et al. ...................... 475/8 |

(Continued)

FOREIGN PATENT DOCUMENTS

| DE | 3246230 | 6/1984 |
| DE | 3246230 A1 | 6/1984 |

(Continued)

OTHER PUBLICATIONS

English translation of International Search Report for PCT/JP2010/060063.

(Continued)

*Primary Examiner* — Justin Holmes
(74) *Attorney, Agent, or Firm* — Muramatsu & Associates

(57) ABSTRACT

A power transmitting device makes a motor in a hybrid vehicle be smaller and lighter, prevents internal resistance and inertia of the generator motor from becoming driving resistance, and can effectively utilize energy. Via a first clutch, power is transmitted from an input shaft to a transmission shaft but power transmission vice versa is blocked, and power transmission from the input shaft to the transmission shaft can be blocked. Via a second clutch, power is transmitted from the transmission shaft to the input shaft, while power transmission vice versa is blocked. Thus, when driving using only the power of the engine, power transmission from the input shaft to the transmission shaft is blocked, thereby preventing transmission of power to the generator motor. Consequently, the generator motor can be made smaller and lighter, and energy losses can be prevented.

14 Claims, 11 Drawing Sheets

(56) References Cited

U.S. PATENT DOCUMENTS

| | | | |
|---|---|---|---|
| 2008/0103002 A1* | 5/2008 | Holmes | 475/5 |
| 2009/0084653 A1* | 4/2009 | Holmes | 192/41 A |
| 2012/0309576 A1* | 12/2012 | Kato | 475/5 |

FOREIGN PATENT DOCUMENTS

| | | |
|---|---|---|
| EP | 1142741 | 10/2001 |
| EP | 1428713 | 6/2004 |
| JP | 08-011567 | 1/1996 |
| JP | 2004-074990 | 3/2004 |
| JP | 2008-174118 | 7/2008 |
| JP | 2008-174118 A | 7/2008 |

OTHER PUBLICATIONS

English version of International Search Report issued by JPO for International Application No. PCT/JP2010/060063.

Office Action issued by Chinese Patent Office for the counterpart Chinese application and its English translation.

Honda Worldwide / Technology Picture Book "The Honda Hybrid System: the engine is the main power source", http://www.honda.co.jp, 2011.

* cited by examiner

POWER TRANSMITTING DEVICE

This application is a national stage of International Patent Application No. PCT/JP2010/060063 filed Jun. 14, 2010 and claims the benefit of foreign filing priority under 35 U.S.C. 119(e) based on Japanese Patent Application No. 2009-140753 filed Jun. 12, 2009, the entire contents of which are incorporated herein by reference.

TECHNICAL FIELD

The present invention relates to a power transmitting device, and more specifically, to a power transmitting device capable of miniaturizing and reducing the weight of a generator motor for a hybrid car provided with an engine and the generator motor, preventing the internal resistance and the inertia of the generator motor from becoming the driving resistance, thereby effectively utilizing the energy.

BACKGROUND ART

As a power transmitting device for a hybrid vehicle provided with an engine and a generator motor as a power source, the Non Patent Literature 1 (listed below), for example, discloses one in which an input shaft to which the power from an engine is transmitted and a rotor of a generator motor are coaxially connected to each other, and a clutch capable of blocking the input from the engine and the generator motor is arranged between the generator motor and a change gear. In the power transmitting device disclosed in the Non Patent Literature 1, because the input shaft and the rotor of the generator motor are connected coaxially, the rotor always rotates in response to the rotation of the input shaft of the engine. Thus, the rotor acts as a flywheel also, and can suppress the fluctuations in the rotation of the engine.

CITATION LIST

Non Patent Literature

[Non Patent Literature 1] "Honda Technology", [online], Honda Motor Co., Ltd., [Searched on Apr. 10, 2009], internet <URL: http://www.honda.co.jp/tech/auto/engine/honda-ima/detail/index.html>

SUMMARY OF INVENTION

Technical Problem

However, according to the power transmitting device disclosed in the Non Patent Literature 1, the rotor always rotates not only in travel assisting and in regenerating by the generator motor but also in high speed traveling when the vehicle travels only by the driving force of the engine. As a result, the motor frame requires the strength sufficient to support the high speed rotation of the rotor in the rotatable range of the engine (the maximum rotational speed may possibly reach approximately 10,000 rpm), and therefore there was a problem that the generator motor became large and was increased in weight.

Also, because the rotor of the generator motor always rotates, there was a problem that the internal resistance and the inertia of the generator motor became the driving resistance and the energy loss was caused in normal traveling when travel assisting by the generator motor was not required.

The present invention has been developed to address the problems described above, and its object is to provide a power transmitting device capable of miniaturizing and reducing the weight of a generator motor for a hybrid vehicle provided with an engine and a generator motor, preventing the internal resistance and the inertia of the generator motor from becoming the driving resistance, and capable of effectively utilizing the energy.

Solution to Problem and Advantageous Effects of Invention

In order to achieve the object, according to the power transmitting device in the first aspect of the invention, by a first clutch, while the power is transmitted from an input shaft to a transmission shaft, transmission of the power from the transmission shaft to the input shaft is blocked and transmission of the power from the input shaft to the transmission shaft can be blocked. Also, by a second clutch, the power is transmitted from the transmission shaft to the input shaft and transmission of the power from the input shaft to the transmission shaft is blocked. Accordingly, by the first clutch and the second clutch, in travel assisting by the generator motor, the power of the generator motor inputted from the transmission shaft is transmitted to the input shaft, whereas in regenerating, the power can be transmitted from the input shaft to the generator motor through the transmission shaft. On the other hand, in high speed traveling when the vehicle travels only by the driving force of the engine, transmission of the power from the input shaft to the transmission shaft is blocked by the first clutch and the second clutch, and transmission of the power to a rotor of the generator motor can be prevented. As a result, because the frame of the generator motor does not require the strength sufficient to support high speed rotation of the rotor, it is possible to achieve an effect that the generator motor can be miniaturized and reduced in weight.

Also, because rotation of the rotor in normal traveling when the travel assistance by the generator motor is not required can be prevented, the event that the internal resistance and the inertia of the generator motor become the driving resistance and the energy loss is caused can be prevented, and there is an effect that the energy can be utilized effectively.

According to the power transmitting device in the second aspect of the invention, by a third clutch, transmission of the power from the input shaft to the change gear is blocked, and, by the first clutch, power transmission from the input shaft to the transmission shaft is blocked, thereby the power is transmitted from the generator motor to the engine through the second clutch, and the generator motor is allowed to act as a starter of the engine. Because transmission of the power from the input shaft to the generator motor side has been blocked, after the engine starts, the power can be transmitted to the change gear only by connecting the third clutch.

On the other hand, in the past, when the generator motor was used as a starter of the engine, in order that the vehicle does not move when the engine starts, the generator motor was activated to rotate the engine in a state where the clutch between the generator motor and the change gear was blocked, and the engine was started. Thus, in order to start the vehicle, it was necessary to connect the clutch after the generator motor was controlled in order not to resist the engine. As a result, there were problems that it took a long time from starting of the engine until starting of the vehicle and the control became complicated.

However, according to the power transmitting device in the second aspect of the invention noted above, because the third clutch for blocking transmission of the power from the input shaft to the change gear is provided, in addition to the effect of the first aspect noted above, this invention produces significant effects that the power can be transmitted from the input shaft to the change gear only by connecting the third clutch which results that complicated control is not required, and the time from start of the engine to transmission of the power to the change gear can be shortened.

Also, by blocking transmission of the power from the input shaft to the change gear by the third clutch in starting the engine, there is an effect that the vibration of the engine in starting can be made hardly be propagated to the vehicle body. Further, there are effects that, by blocking transmission of the power from the input shaft to the change gear by the third clutch, all the power from the engine is transmitted to the rotor in a state the vehicle is stopped, and the electric power can be generated using the generator motor.

According to the power transmitting device in the third aspect of the invention, in a fourth clutch, an energizing force is applied to sprags by an energizing member, the sprags tilt toward the self-lock direction, thereby a friction force occurs at contact points of the engaging surfaces with the outer peripheral surface and the inner peripheral surface, and the sprags engage with an inner ring and an outer ring due to a self-lock angle. As a result, relative rotation with respect to the inner ring and the outer ring toward a specific rotational direction is restricted. On the other hand, a load is applied to the sprags by a load application device resisting the energizing force of the energizing member, the sprags tilt toward the counter-self-lock direction, thereby engagement of the sprags with the inner ring and the outer ring is released, and the inner ring and the outer ring rotate relatively with each other. Because transmitting and blocking of the rotation toward a specific direction are switched by tilting the sprags thus, in addition to the effects of the first and second aspects noted above, there are effects that the time required for switching can be shortened and the speed can be changed quickly.

Also, because the power is transmitted toward a specific direction and blocked by tilting the sprags, slipping of the inner ring and the outer ring with each other can be prevented when the speed is changed from the state where the transmission of power is being blocked to the state where the power is being transmitted. Therefore, it is possible to achieve an effect that generation of the impact in speed changing can be prevented.

Further, by operating the load application device of the fourth clutch, transmission of the power from the connecting shaft to the output shaft is blocked, and, after the engine starts, the power can be transmitted from the connecting shaft to the output shaft by stopping operation of the load application device. Thus, because the power can be transmitted to the output shaft only by stopping operation of the load application device, there are effects that complicated control is not required and the time from the start of the engine until transmission of the power to the output shaft can be shortened.

According to the power transmitting device in the fourth aspect of the invention, because a fifth clutch blocking transmission of the power from the engine to a switching device is provided, in addition to any effect of the first to third aspects noted above, there are effects that, by separating the engine from the switching device in regenerating, the engine can be prevented from becoming the driving resistance of the generator motor, the energy loss can be eliminated, and the regeneration amount can be increased. Also, by separating the engine from the switching device, the vehicle can travel by the driving force of the generator motor only, and therefore there is an effect that the fuel consumption amount of the engine can be suppressed.

According to the power transmitting device in the fifth aspect of the invention, because the change gear is connected to the switching device not through the clutch, the sprags can be tilted toward the self-lock direction by the energizing force of the energizing member only by the control of stopping operation of the load application device of the fourth clutch after the engine is started by the generator motor in a state the load application device of the fourth clutch is operated. Thus, the power from the engine is transmitted to the output shaft, and the vehicle can be started. Therefore, in addition to the effects of the third or fourth aspect noted above, there are the effects that from the start of the engine to the start of the vehicle can be controlled easily, and the time required therefor can be shortened.

According to the power transmitting device in the sixth aspect of the invention, because a step-up gear for increasing the rotational speed of the rotor by rotation of the input shaft is provided, in addition to any effect of first to fifth aspects noted above, there are the effects that the rotational speed of the rotor is increased while the electric power is generated and the electric power generation amount can be increased. Also, there is an effect that the torque of the input shaft can be increased in starting the engine and in travel assisting by the generator motor.

DESCRIPTION OF EMBODIMENTS

Figure 1:
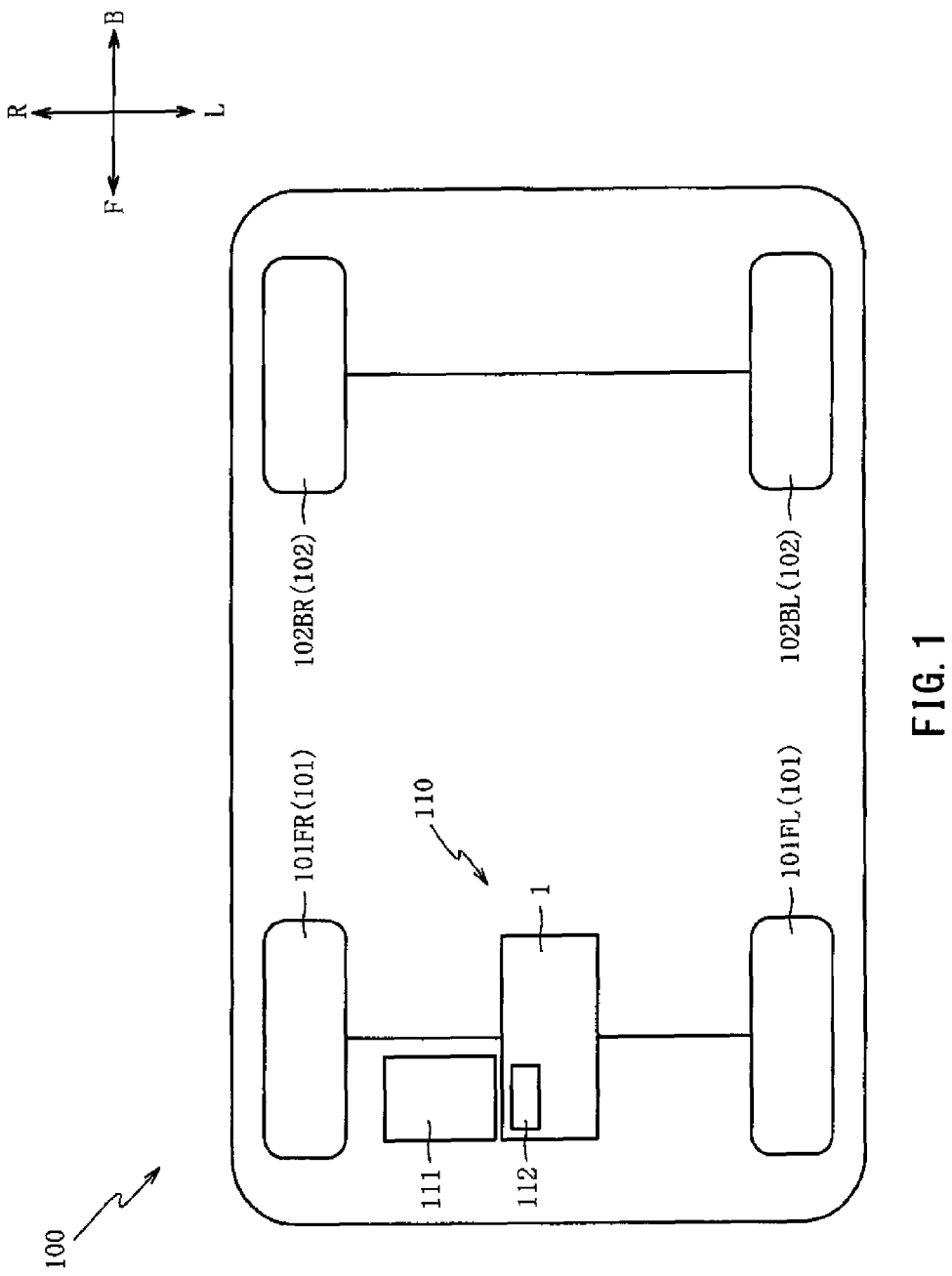
FIG. 1 is a schematic view schematically showing a vehicle mounting a power transmitting device in a first embodiment of the present invention.

Below, embodiments of the present invention will be described referring to attached drawings. FIG. 1 is a schematic view schematically showing a vehicle 100 mounting a power transmitting device 1 in a first embodiment of the present invention. Arrows F-B, L-R in FIG. 1 respectively show the front-back direction and the left-right direction of the vehicle 100.

First, the constitution outline of the vehicle 100 will be described. As shown in FIG. 1, the vehicle 100 includes a front unit 110 driving front wheels 101 (a left front wheel 101FL and a right front wheel 101FR). The front unit 110 mainly includes an engine 111 and a generator motor 112 as power sources, and a power transmitting device 1 for transmitting the power of the engine 111 and the generator motor 112 to the front wheels 101, and is constituted so as to drive the front wheels 101 while selecting the power of the two sources of the engine 111 and the generator motor 112. Also, the front unit 110 is constituted so as to regenerate the power generated by the generator motor 112 since the generator motor 112 also functions as a power generator.

Figure 2:
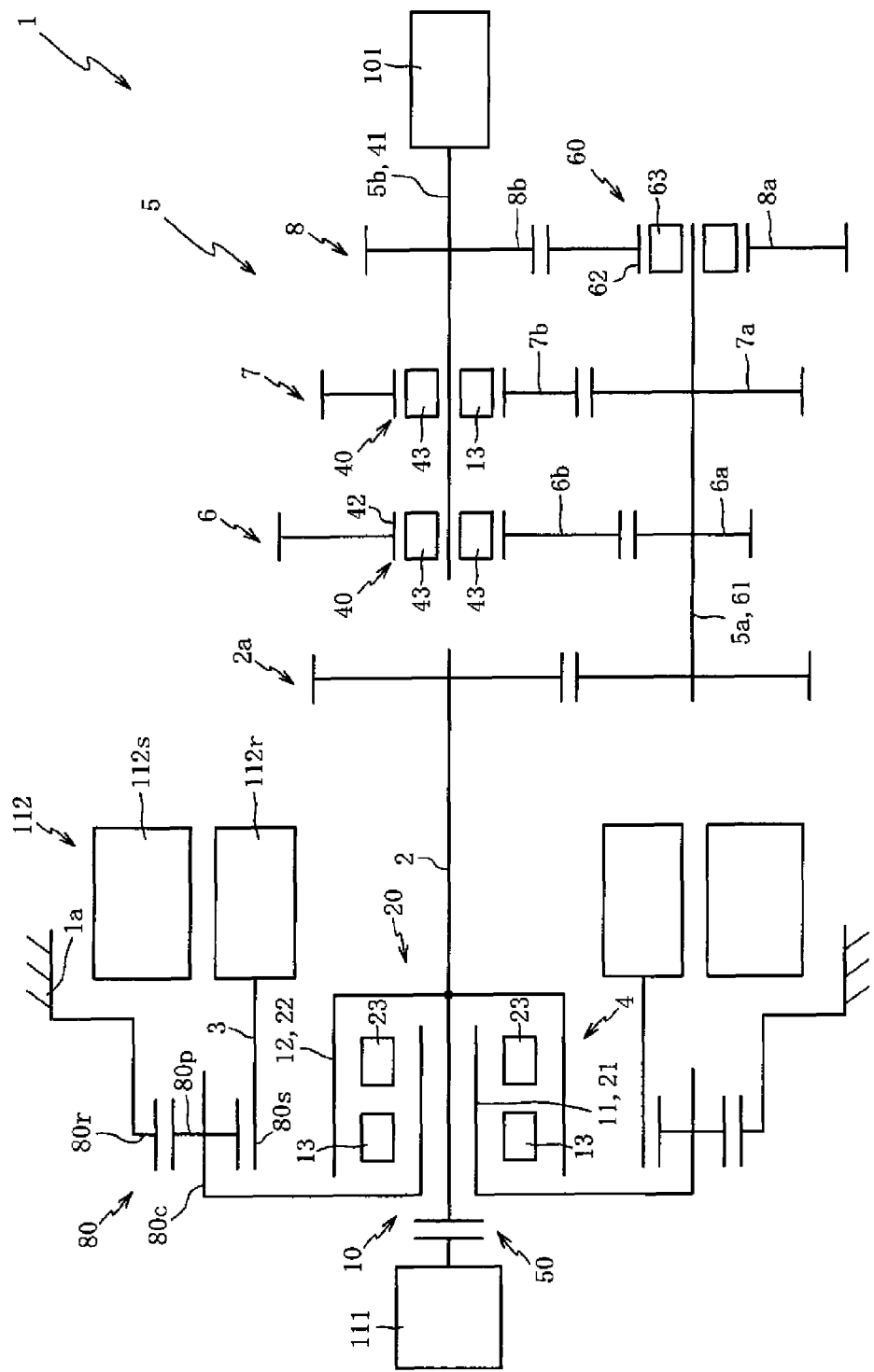
FIG. 2 is a schematic view schematically showing a power transmitting device in the first embodiment.

Next, the detailed constitution of the power transmitting device 1 will be described referring to FIG. 2 which schematically shows the internal structure of the power transmitting device 1. In FIG. 2, for the purpose of facilitating understanding, only the constitutions that perform the function of transmitting the power are shown. As shown in FIG. 2, the power transmitting device 1 is constituted so as to mainly include an input shaft 2 transmitting the power from the engine 111 to a change gear 5, a transmission shaft 3 transmitting the power transmitted from the input shaft 2 to the generator motor 112, and a switching device 4 disposed on a power transmission route from the input shaft 2 to the transmission shaft 3. The switching device 4 switches the power transmitting direction between the input shaft 2 and the transmission shaft 3. In the present embodiment, the switching device 4 is disposed on the input shaft 2.

Further, the power transmitting device 1 is constituted so as to include a transmission gear pair 2a to which the power is transmitted from the input shaft 2, and the change gear 5 to which the power is transmitted from the transmission gear pair 2a. The change gear 5 is connected to the switching device 4 not through a clutch. The change gear 5 is constituted so as to mainly include a connecting shaft 5a connected to the input shaft 2 through the transmission gear pair 2a and inputted with the power from the engine 111, an output shaft 5b disposed in parallel with the connecting shaft 5a, plural first gear pairs 6, 7 disposed on the output shaft 5b and the connecting shaft 5a and set so as to mesh with each other and to make different gear ratios, and a second gear pair 8 disposed on the output shaft 5b and the input shaft 5a and engaging with each other. Also, the power transmitted to the output shaft 5b is constituted so as to be outputted to outside the power transmitting device 1 and transmitted to the front wheels 101.

The power transmitting device 1 transmits the power between the generator motor 112 including a stator 112s and a rotor 112r and the input shaft 2 through a step-up gear 80. In the present embodiment, the step-up gear 80 is constituted so as to include a planetary gear device. The planetary gear device (the step-up gear 80) includes a sun gear 80s rotating with inputted rotation transmitted from the transmission shaft connected to the rotor 112r, plural planetary gears 80p meshed with the outer periphery of the sun gear 80s, a ring gear 80r meshed with the plural planetary gears 80p, and a carrier 80c supporting the plural planetary gears 80p. The carrier 80c rotates around the rotation center of the sun gear 80s, and transmits the inputted rotation from the transmission shaft 3 to the switching device 4. The ring gear 80r is fixed to a case 1a composing an enclosure of the power transmitting device 1 so as not to be rotatable.

Here, when the teeth number of the sun gear 80s is a, the teeth number of the planetary gear 80p is b, and the teeth number of the ring gear 80r is c, the reduction ratio (rotational speed of the sun gear 80s/rotational speed of the carrier 80c) of the step-up gear 80 becomes 1+c/a regardless of the teeth number b of the planetary gear 80p, and the rotational speed of the sun gear 80s becomes (1+c/a) times of the rotational speed of the carrier 80c. Thus, when the power is transmitted from the input shaft 2 to the transmission shaft 3, the rotational speed of the transmission shaft 3 is increased to increase the rotational speed of the rotor 112r, and the electric power generation amount by the generator motor 112 can be increased. On the other hand, in starting the engine 111 and in travel assisting by the generator motor 112 when the power of the generator motor 112 is transmitted from the transmission shaft 3 to the input shaft 2, the torque of the input shaft 2 is increased, and the starting performance and the acceleration performance can be improved.

The switching device 4 is constituted so as to include a first clutch 10 and a second clutch 20. The first clutch 10 is for transmitting and blocking the power between the input shaft 2 and the transmission shaft 3, and is constituted so as to block transmission of the power from the transmission shaft 3 to the input shaft 2 and to be capable of blocking transmission of the power from the input shaft 2 to the transmission shaft 3 while transmitting the power inputted from the input shaft 2 to the transmission shaft 3.

Figure 3:
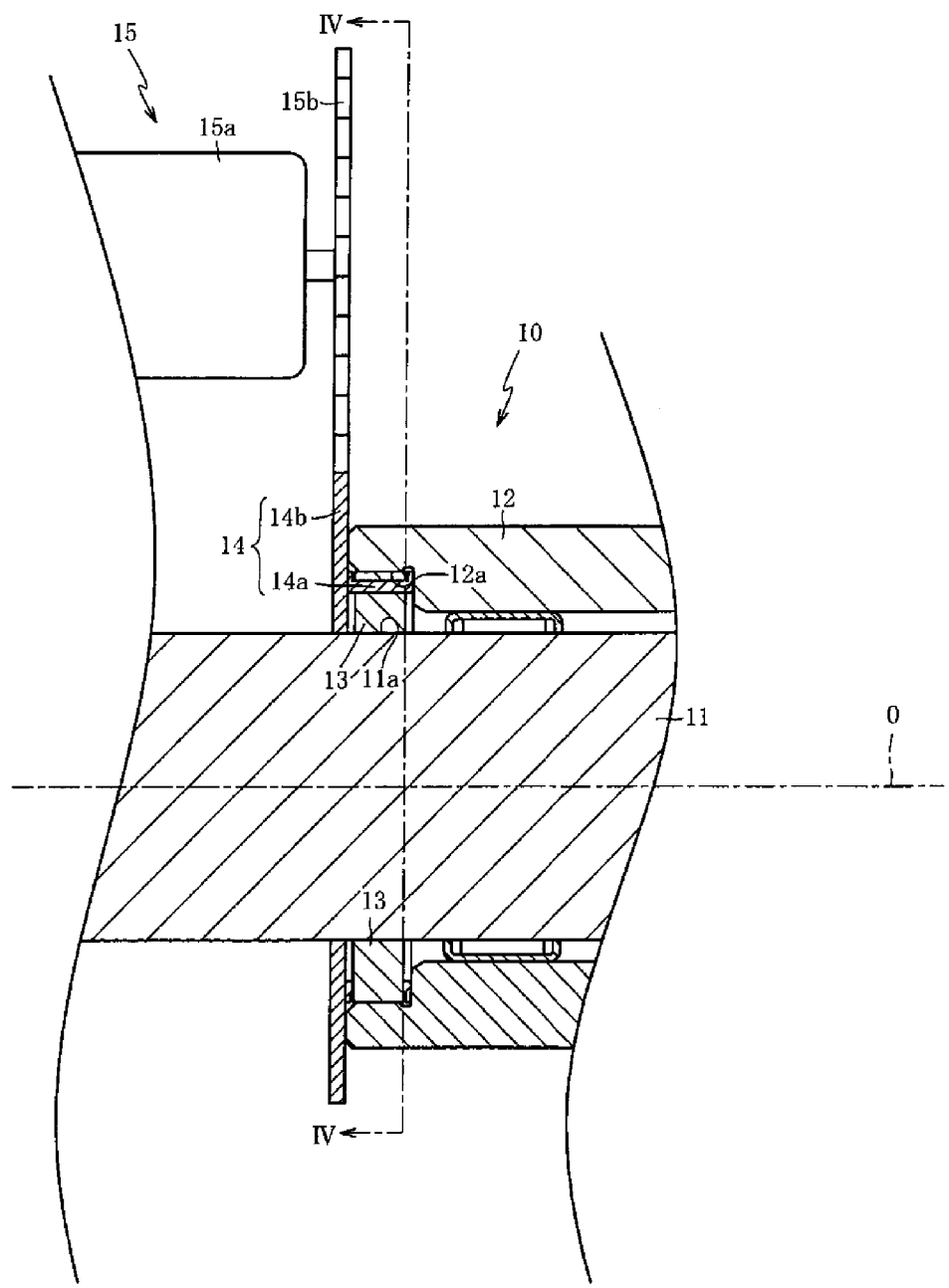
FIG. 3 is a cross-sectional view of the first clutch.
Figure 4:
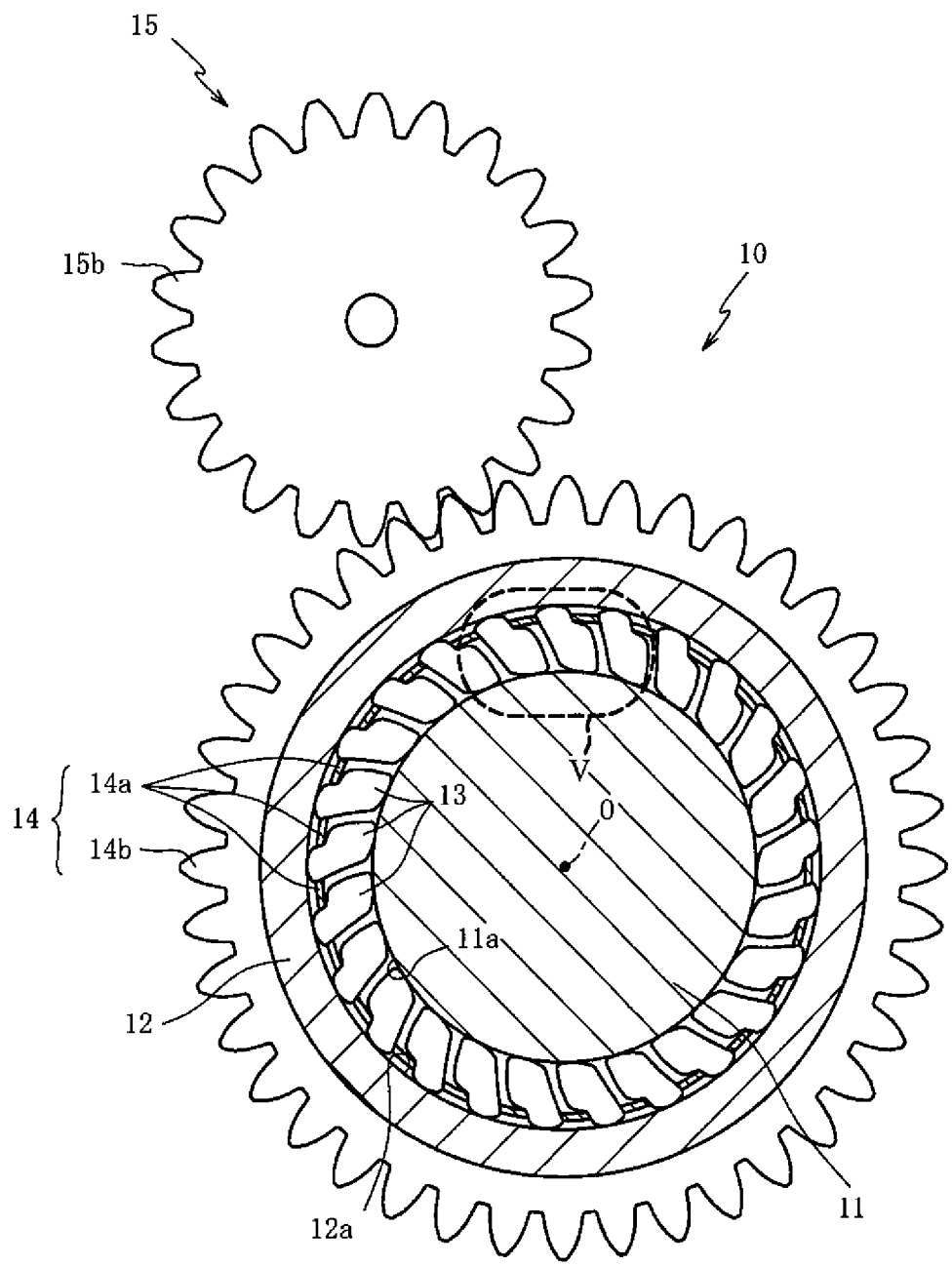
FIG. 4 is a cross-sectional view of the first clutch taken along the line IV-IV in FIG. 3.

Here, the detailed constitution of the first clutch 10 will be described referring to FIG. 3 and FIG. 4. FIG. 3 is a cross-sectional view of the first clutch 10, and FIG. 4 is a cross-sectional view of the first clutch 10 taken along the line IV-IV in FIG. 3. As shown in FIG. 3 and FIG. 4, the first clutch 10 is constituted so as to mainly include a first inner ring 11, a first outer ring 12 surrounding the outer periphery of the first inner ring 11, plural first sprags 13 disposed between the first inner ring 11 and the first outer ring 12, a retainer 14 retaining the first sprags 13, and a load application device 15.

The first inner ring 11 is to transmit the power, and includes an outer peripheral surface 11a with a circular cross-sectional shape and is constituted so as to be rotatable around an axis O as shown in FIG. 3 and FIG. 4. Also, the first inner ring 11 is connected to the carrier 80c (refer to FIG. 2). The first outer ring 12 is to transmit the power in combination with the first inner ring 11, and includes an inner peripheral surface 12a with a circular cross-sectional shape opposing the outer peripheral surface 11a of the first inner ring 11 and is constituted so as to be rotatable around the axis O similarly to the first inner ring 11 as shown in FIG. 3 and FIG. 4. Also, the first outer ring 12 is connected to the input shaft (refer to FIG. 2).

Figure 5:
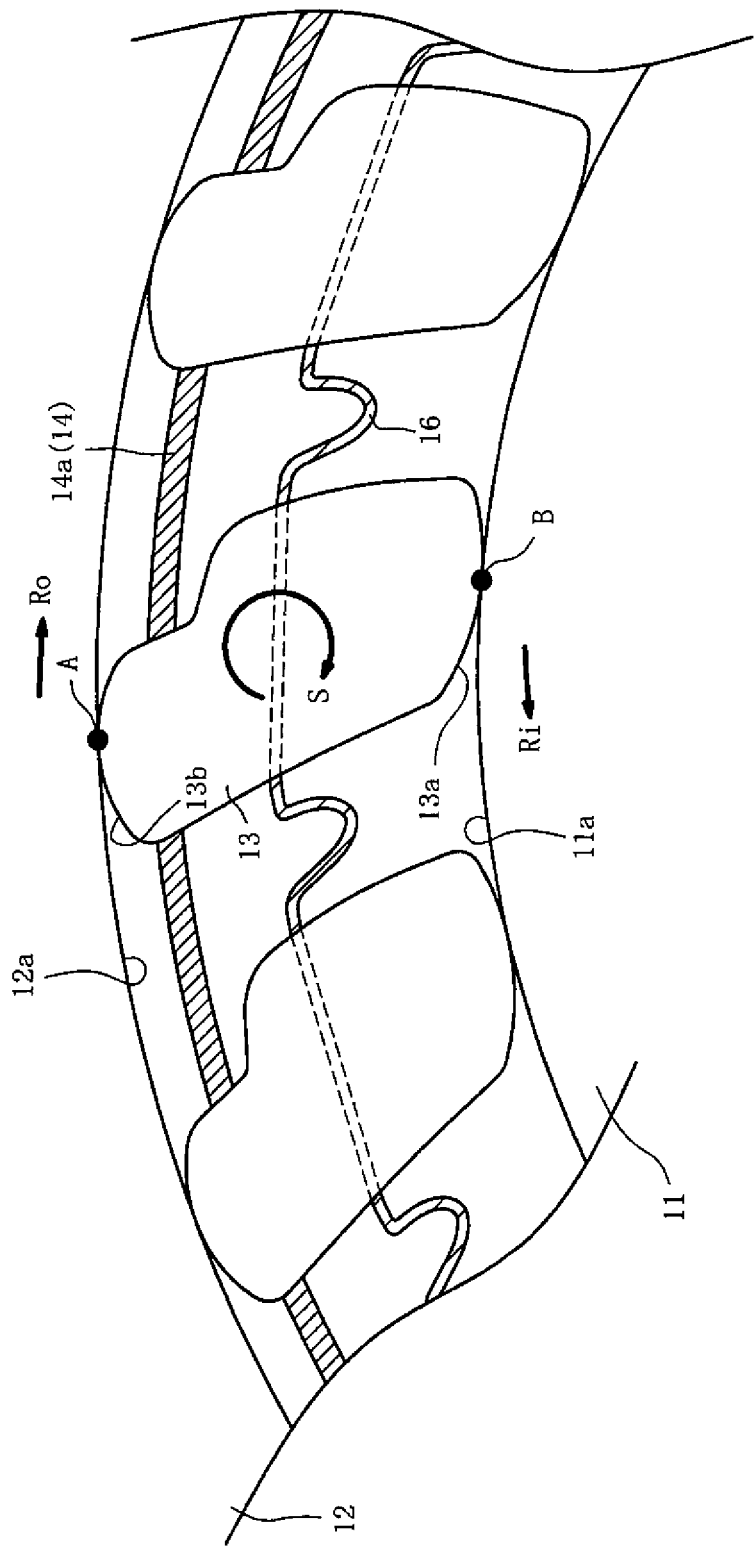
FIG. 5 is a partial enlarged cross-sectional view of the first clutch showing a part shown in V of FIG. 4 in an enlarged state.

The first sprags 13 are for engaging the first inner ring 11 and the first outer ring 12 with each other, and include engaging surfaces 13a, 13b (refer to FIG. 5) contacting the outer peripheral surface 11a and the inner peripheral surface 12a respectively. The first sprags 13 are disposed by plural numbers at a constant interval in the peripheral direction between the opposing outer peripheral surface 11a and the inner peripheral surface 12a as shown in FIG. 4. Also, the first sprags 13 are energized toward the peripheral direction of the outer peripheral surface 11a and the inner peripheral surface 12a by a ribbon spring 16 (refer to FIG. 5). Here, the ribbon spring 16 will be described referring to FIG. 5. FIG. 5 is a partial enlarged cross-sectional view of the first clutch 10 showing a part shown in V of FIG. 4 in an enlarged state.

The ribbon spring 16 generates an angular moment of the arrow S direction (hereinafter referred to as "the self-lock direction") of FIG. 5 in the first sprags 13 so as to apply an energizing force to the first sprags 13 and to make the engaging surfaces 13a, 13b contact the outer peripheral surface 11a and the inner peripheral surface 12a. The ribbon spring 16 is formed by subjecting a metallic material with bending work in a wave shape as shown in FIG. 5, and is constituted so as to apply an energizing force to the first sprags 13 utilizing its elasticity. However, the ribbon spring 16 may be formed of a coil spring. By applying the energizing force to the first sprags 13 by the ribbon spring 16, the first sprags 13 tilt toward the self-lock direction so that the engaging surfaces 13a, 13b contact the outer peripheral surface 11a and the inner peripheral surface 12a. As a result, as shown in FIG. 5, friction forces are generated at contact points A of the inner peripheral surface 12a and the engaging surfaces 13b and contact points B of the outer peripheral surface 11a and the engaging surfaces 13a. Further, when the first inner ring 11 and the first outer ring 12 rotate toward a predetermined direction, because of the positional shifting of the respective contact points A, B in the peripheral direction of the outer peripheral surface 11a and the inner peripheral surface 12a, the first sprags 13 engage with the first inner ring 11 and the first outer ring 12.

That is, when the first outer ring 12 rotates relative to the first sprags 13 toward the arrow Ro direction (hereinafter referred to as "the lock direction") of FIG. 5 when viewed from the first inner ring 11 side in relative rotation with respect to the first inner ring 11, the first sprags 13 engage with the first inner ring 11 and the first outer ring 12. Thus, the input shaft 2 (refer to FIG. 2) rotates with the first outer ring 12. On the other hand, when the first outer ring 12 rotates relative to the first sprags 13 toward the counter-arrow Ro direction (hereinafter referred to as "the free direction") of FIG. 5 when viewed from the first inner ring 11 side in relative rotation with respect to the first inner ring 11, the first sprags tilt toward the counter-self-lock direction resisting the energizing force of the ribbon spring 16 by the friction force applied to the contact points A, and engagement of the first sprags 13 with the first inner ring 11 and the first outer ring 12 is released. As a result, the first outer ring 12 makes the first inner ring 11 idly rotate.

Also, when the first inner ring 11 rotates relative to the first sprags 13 toward the arrow Ri direction (the lock direction) of FIG. 5 when viewed from the first outer ring 12 side in relative rotation with respect to the first outer ring 12, the first sprags 13 engage with the first inner ring 11 and the first outer ring 12. As a result, the first outer ring 12 rotates with the first inner ring 11 (refer to FIG. 2). On the other hand, when the first inner ring 11 rotates relative to the first sprags 13 toward the counter-arrow Ri direction (the free direction) of FIG. 5 when viewed from the first outer ring 12 side in relative rotation with respect to the first outer ring 12, the first sprags tilt toward the counter-self-lock direction resisting the energizing force of the ribbon spring 16 by the friction force applied to the contact points B, and the first outer ring 12 makes the first inner ring 11 (refer to FIG. 2) idly rotate.

Referring back to FIG. 3 and FIG. 4, the retainer 14 retains the first sprags 13 so as to tilt toward the peripheral direction of the outer peripheral surface 11a and the inner peripheral surface 12a, and includes a retaining part 14a and a load transmitting part 14b. The retaining part 14a extends toward the axis O direction and retains the upper end side of the first sprags 13 as shown in FIG. 3 and FIG. 4.

The load transmitting part 14b receives a load from the load application device 15, and extends toward the direction crossing the axis O direction as shown in FIG. 3. Thus, when compared with the case the load transmitting part 14b is extended toward the axis O direction, the dimension of the retainer 14 in the axis O direction can be shortened, and the first clutch 10 can be miniaturized. Also, as shown in FIG. 4, the load transmitting part 14b is formed in a gear shape such that the load is transmitted from the load application device 15 through a gear mechanism constituted with a pinion 15b described below. Thus, the energy loss caused through a load transmission route from the load application device 15 to the retainer 14 can be reduced, and the load can be transmitted to the retainer 14 efficiently.

The load application device 15 applies a load to the first sprags 13 while resisting the energizing force of the ribbon spring 16 thereby tilting the first sprags 13 toward the counter-self-lock direction (opposite to the arrow S rotational direction of FIG. 5), and includes an actuator 15a and the pinion 15b as shown in FIG. 3 and FIG. 4.

The actuator 15a is a power source for generating a load applied to the first sprags 13, and is constituted of a motor (an AC motor or a DC motor) driven by the electric power supplied from an electric power source (not shown). Thus, because the actuator 15a is constituted of the motor, when compared with the case the actuator 15a is constituted of a cylinder, a solenoid, and the like for example, the structure of the load application device 15 can be simplified and miniaturized. Also, when the structure of the load application device 15 is complicated, the load application device 15 becomes large and the first clutch 10 becomes large, however, in the present invention, since the structure of the load application device 15 can be simplified and miniaturized, the first clutch 10 can be miniaturized.

The pinion 15b transmits the power of the actuator 15a to the retainer 14, and is formed into a gear shape engaging with the load transmitting part 14b of the retainer 14 to constitute the gear mechanism with the load transmitting part 14b as shown in FIG. 3. By transmission of the power of the actuator 15a to the retainer 14 by the pinion 15b, the load is applied to the first sprags 13 through the retainer 14. Thus, because the load application device 15 applies the load to the first sprags 13 through the retainer 14, the load can be applied to a plurality of the first sprags 13 at one time with high efficiency.

According to the load application device 15 constituted as described above, by applying the load to the first sprags 13 resisting the energizing force of the ribbon spring 16, the first sprags 13 are tilted toward the counter-self-lock direction, and engagement of the first sprags 13 with the first inner ring 11 and the first outer ring 12 can be released forcibly. Thus, even when the power transmitted from the generator motor 112 is inputted to the first inner ring 11 of the first clutch 10 and the first inner ring 11 rotates to the lock direction (the arrow Ri direction of FIG. 5) relative to the first sprags 13, engagement of the first sprags 13 with the first inner ring 11 and the first outer ring 12 is released forcibly by the load application device 15, thereby the first outer ring 12 is rotated idly, and transmission of the power between the input shaft 2 and the transmission shaft 3 can be blocked. Also, even when the power transmitted from the engine 111 is inputted to the first outer ring 12 of the first clutch 10 and the first outer ring 12 rotates toward the lock direction (the arrow Ro direction of FIG. 5) relative to the first sprags 13, engagement of the first sprags 13 with the first inner ring 11 and the first outer ring 12 is released forcibly by the load application device 15, thereby the first inner ring 11 is rotated idly, and transmission of the power between the input shaft 2 and the transmission shaft 3 can be blocked.

Figure 6:
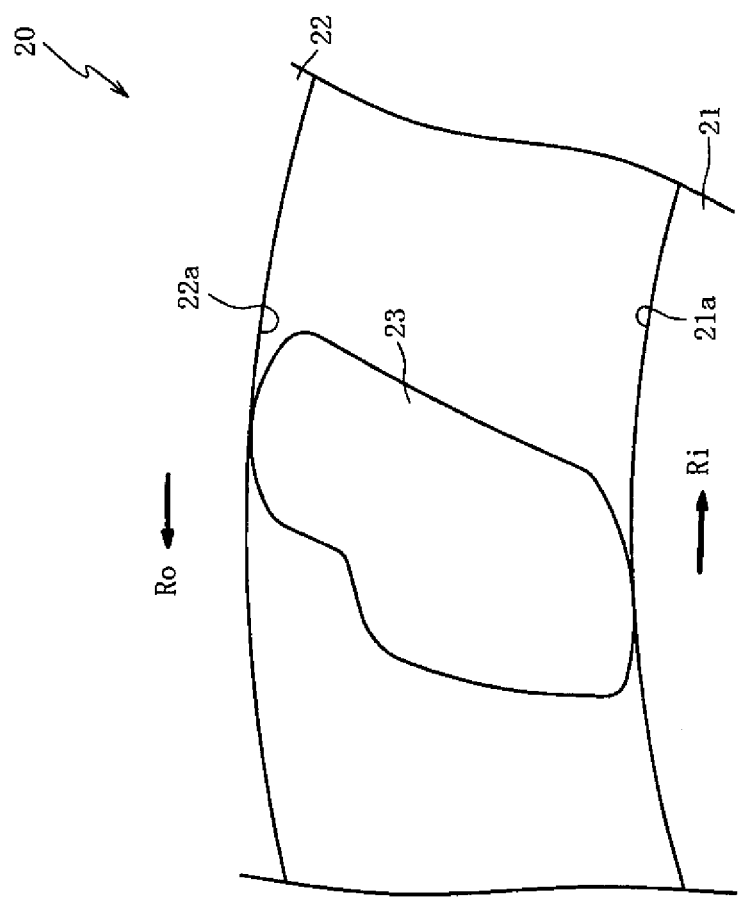
FIG. 6 is a schematic view schematically showing the internal structure of the second clutch.

Next, the second clutch 20 of the switching device 4 will be described referring to FIG. 6. FIG. 6 is a schematic view schematically showing the internal structure of the second clutch 20. The second clutch 20 is for transmitting the power inputted from the transmission shaft 3 to the input shaft 2 while blocking transmission of the power from the input shaft 2 to the transmission shaft 3. Because the second clutch 20 is constituted similarly to the first clutch 10 with the exception that the load application device 15 is omitted, detailed description will be omitted. A second inner ring 21 (refer to FIG. 2) of the second clutch 20 is connected to the carrier 80c, and a second outer ring 22 (refer to FIG. 2) is connected to the input shaft 2.

According to the second clutch 20, when the power of the engine 111 is inputted from the second outer ring 22 and the second outer ring 22 rotates relative to the second sprags 23 toward the arrow Ro direction (the lock direction) of FIG. 6 when viewed from the second inner ring 21 side in relative rotation with respect to the second inner ring 21, second sprags 23 engage with an outer peripheral surface 21a of the second inner ring 21 and an inner peripheral surface 22a of the second outer ring 22. As a result, the second outer ring 22 rotates with the second inner ring 21, and the power is transmitted from the second outer ring 22 to the second inner ring 21. On the other hand, when the second outer ring 22 rotates relative to the second sprags 23 toward the counter-arrow Ro direction (the free direction) of FIG. 6 when viewed from the second inner ring 21 side in relative rotation with respect to the second inner ring 21, engagement of the second sprags 23 with the second inner ring 21 and the second outer ring 22 is released, and the second outer ring 22 makes the second inner ring 21 idly rotate.

Also, when the power from the generator motor 112 is transmitted to the second clutch 20 and the second inner ring 21 rotates relative to the second sprags 23 toward the counter-arrow Ri direction (the free direction) of FIG. 6 when viewed from the second outer ring 22 side in relative rotation with respect to the second outer ring 22, engagement of the second sprags 23 with the second inner ring 21 and the second outer ring 22 is released. As a result, the second outer ring 22 makes the input shaft 2 idly rotate, and transmission of the power between the input shaft 2 and the transmission shaft 3 is blocked. On the other hand, when the second inner ring 21 rotates relative to the second sprags 23 toward the arrow Ri direction (the lock direction) of FIG. 6 when viewed from the second outer ring 22 side in relative rotation with respect to the second outer ring 22, the second sprags 23 engage with the second inner ring 21 and the second outer ring 22. As a result, the second outer ring 22 rotates with the second inner ring 21, and the power is transmitted between the input shaft 2 and the transmission shaft 13.

Referring back to FIG. 2, in the input shaft 2 from the engine 111 to the switching device 4, a fifth clutch 50 is disposed. With the fifth clutch 50, transmission of the power from the engine 111 to the switching device 4 and the change gear 5 can be blocked. The first gear pairs 6, 7 of the change gear 5 include driving gears 6a, 7a disposed on the connecting shaft 5a and driven by the power transmitted from the input shaft 2 to the connecting shaft 5a, and driven gears 6b, 7b disposed on the output shaft 5b and followingly driven by the driving gears 6a, 7a. Here, with respect to the first gear pairs 6, 7, the first speed and the second speed are disposed so as to be closer to the transmission gear pair 2a in the order of decreasing gear ratio (teeth number of driven gear/teeth number of driving gear), thus, in the present embodiment, the first gear pair 6 is assigned to the first speed and the first gear pair 7 is assigned to the second speed. Here, the reverse travel stage is omitted in the illustration. With respect to the reverse travel stage, a pinion gear can be inserted between the first gear pair.

The driving gears 6a, 7a constituting the first gear pairs 6, 7 are formed integrally with the connecting shaft 5a respectively. On the other hand, the driven gears 6b, 7b respectively opposing to and engaging with the driving gears 6a, 7a are fixed to the output shaft 5b through a fourth clutch 40 described below. The fourth clutch 40 is for blocking transmission of the power from the output shaft 5b to the connecting shaft 5a while transmitting the power from the connecting shaft 5a to the output shaft 5b. The fourth clutch 40 is also constituted to be capable of blocking transmission of the power from the connecting shaft 5a to the output shaft 5b. Because the fourth clutch 40 is constituted similarly to the first clutch 10, detailed description thereof will be omitted. Also, with respect to a portion same as the corresponding portion of the first clutch, a same reference numeral is used and description of which will be hereinafter omitted.

A fourth inner ring 41 of the fourth clutch 40 is formed integrally with the output shaft 5b, and a fourth outer ring 42 is formed integrally with the driven gears 6b, 7b. According to the fourth clutch 40, when the power of the engine 111 and the generator motor 112 is inputted from the driven gears 6b, 7b through the input shaft 2, the connecting shaft 5a and the driving gears 6a, 7a and the fourth outer ring 42 connected to the driven gears 6b, 7b rotates relative to fourth sprags 43 toward the lock direction (the arrow Ro direction of FIG. 5) when viewed from the fourth inner ring 41 side in relative rotation with respect to the fourth inner ring 41, the fourth sprags 43 engage with the fourth inner ring 41 and the fourth outer ring 42. As a result, the output shaft 5b rotates with the driven gears 6b, 7b and the power is transmitted. On the other hand, when the fourth outer ring 42 rotates relative to the fourth sprags 43 toward the free direction (the counter-arrow Ro direction of FIG. 5) when viewed from the fourth inner ring 41 side in relative rotation with respect to the fourth inner ring 41, engagement of the fourth sprags 43 with the fourth inner ring 41 and the fourth outer ring 42 is released, and the driven gears 6b, 7b make the output shaft 5b idly rotate.

Also, when the power is transmitted from the output shaft 5b to the fourth inner ring 41 of the fourth clutch 40, the fourth inner ring 41 rotates relative to the fourth sprags 43 to the free direction (the counter-arrow Ri direction of FIG. 5) when viewed from the fourth outer ring 42 side in relative rotation with respect to the fourth outer ring 42, engagement of the fourth sprags 43 with the fourth inner ring 41 and the fourth outer ring 42 is released. As a result, the driven gears 6b, 7b make the output shaft 5b idly rotate, and transmission of the power from the output shaft 5b to the connecting shaft 5a is blocked. On the other hand, when the fourth inner ring 41 rotates relative to the fourth sprags 43 toward the lock direction (the arrow Ri direction of FIG. 5) when viewed from the fourth outer ring 42 side in relative rotation with respect to the fourth outer ring 42, the fourth sprags 23 engage with the fourth inner ring 41 and the fourth outer ring 42. As a result, the driven gears 6b, 7b rotate with the output shaft 5b, and the power is transmitted.

Because the fourth clutch 40 includes the load application device 15 (refer to FIG. 4) similarly to the first clutch 10, even when the power is transmitted to the fourth inner ring 41 and the fourth outer ring 42 and the fourth inner ring 41 and the fourth outer ring 42 rotate relative to the fourth sprags 43 toward the lock direction (the arrow Ri direction or the arrow Ro direction of FIG. 5), engagement of the fourth sprags 43 with the fourth inner ring 41 and the fourth outer ring 42 can be forcibly released by the load application device 15. Thus the fourth outer ring 42 is rotated idly, and transmission of the power can be blocked.

A driving gear 8a constituting the second gear pair 8 is formed integrally with the connecting shaft 5a through a sixth clutch 60 described below. On the other hand, a driven gear 8b opposing to and engaging with the driving gear 8a is fixed to the output shaft 5b. The sixth clutch 60 is for blocking transmission of the power from the connecting shaft 5a to the output shaft 5b while transmitting the power from the output shaft 5b to the connecting shaft 5a. The sixth clutch 60 is also constituted to be capable of blocking transmission of the power from the output shaft 5b to the connecting shaft 5a. Because the sixth clutch 60 is constituted similarly to the first clutch 10 (refer to FIG. 5) with the exception that the load application device 15 is omitted, detailed description thereof will be omitted. Also, with respect to a portion same as the corresponding portion of the first clutch 10, a same reference numeral is used and description of which will be hereinafter omitted.

A sixth inner ring 61 of the sixth clutch 60 is formed integrally with the connecting shaft 5a, and a sixth outer ring 62 is formed integrally with the driving gear 8a. According to the sixth clutch 60, when the power of the engine 111 and the generator motor 112 is transmitted to the input shaft 2 and the connecting shaft 5a and the sixth inner ring 61 of the sixth clutch 60 rotates relative to sixth sprags 63 to the free direction (the counter-arrow Ri direction of FIG. 5) when viewed from the sixth outer ring 62 side in relative rotation with respect to the sixth outer ring 62, engagement of the sixth sprags 63 with the sixth inner ring 61 and the sixth outer ring 62 is released, the connecting shaft 5a makes the driving gear 8a idly rotate, and transmission of the power from the connecting shaft 5a to the output shaft 5b is blocked. On the other hand, when the sixth inner ring 61 rotates relative to the sixth sprags 63 toward the lock direction (the arrow Ri direction of FIG. 5) when viewed from the sixth outer ring 62 side in relative rotation with respect to the sixth outer ring 62, the sixth sprags 63 engage with the sixth inner ring 61 and the sixth outer ring 62. As a result, the connecting shaft 5a rotates with the driving gear 8a, and the power is transmitted.

Also, when the power is transmitted to the sixth clutch 60 from the output shaft 5b through the driven gear 8b and the driving gear 8a, the sixth outer ring 62 rotates relative to the sixth sprags 63 to the lock direction (the arrow Ro direction of FIG. 5) when viewed from the sixth inner ring 61 side in relative rotation with respect to the sixth inner ring 61, and the sixth sprags 63 engage with the sixth inner ring 61 and the sixth outer ring 62. As a result, the driving gear 8a rotates with the connecting shaft 5a, and the power is transmitted. On the other hand, when the sixth outer ring 62 rotates relative to the sixth sprags 63 toward the free direction (the counter-arrow Ro direction of FIG. 5) when viewed from the sixth inner ring 61 side in relative rotation with respect to the sixth inner ring 61, engagement of the sixth sprags 63 with the sixth inner ring 61 and the sixth outer ring 62 is released. As a result, the driving gear 8a makes the connection shaft 5a idly rotate, and transmission of the power from the output shaft 5b to the connecting shaft 5a is blocked.

Next, the working condition of the power transmitting device 1 in the first embodiment constituted as described above will be described referring to FIG. 7 to FIG. 11. FIG. 7 to FIG. 11 schematically show the front views of the internal structure of the power transmitting device 1. In FIG. 7 to FIG. 11, in order to facilitate understanding, the transmission route of the power is shown in the arrow P, and respective rotational directions of the driving gears 6a, 7a, 8a, the driven gears 6b, 7b, 8b, the fourth outer ring 42 of the fourth clutch 40 and the sixth outer ring 62 of the sixth clutch 60 are indicated by the arrows. Also, the case in which the load application devices 15 of the first clutch 10 and the fourth clutch 40 are operated and engagement of the first sprags 13 and the fourth sprags 43 with the first inner ring 11 and the first outer ring 12, as well as the fourth inner ring 41 and the fourth outer ring 42 is released is described as "ON", whereas the case in which the load application devices 15 of the first clutch 10 and the fourth clutch 40 are not operated and the first sprags 13 and the fourth sprags 43 can engage is described as "OFF".

Also, as described above, in the present embodiment, the first gear pairs 6, 7 are disposed so as to be closer to the transmission gear pair 2a in the order of decreasing gear ratio (teeth number of driven gear/teeth number of driving gear). When the gear ratios of the first gear pairs 6, 7 and the second gear pair 8 are k1, k2, k3 in this order, the gear ratios have the relation of k1>k2>k3. Further, the driven gear 8b of the second gear pair 8 is formed so that the teeth number thereof becomes smaller than the minimum teeth number between the teeth number of the driven gears 6b, 7b of the first gear pairs 6, 7 (the teeth number of the driven gear 7b in the present embodiment). Thus, when the power is transmitted from the connecting shaft 5a to the output shaft 5b and the rotational speeds of the driven gears 6b, 7b, 8b are $\alpha 1$, $\alpha 2$, $\alpha 3$ respectively, respective rotational speeds are unequivocally decided by the rotational speed of the connecting shaft 5a, and have the relation of $\alpha 1 < \alpha 2 < \alpha 3$ from the relation of the gear ratio. Also, the rotational speed of the output shaft 5b becomes the rotational speed according to the shift stage.

Figure 7:
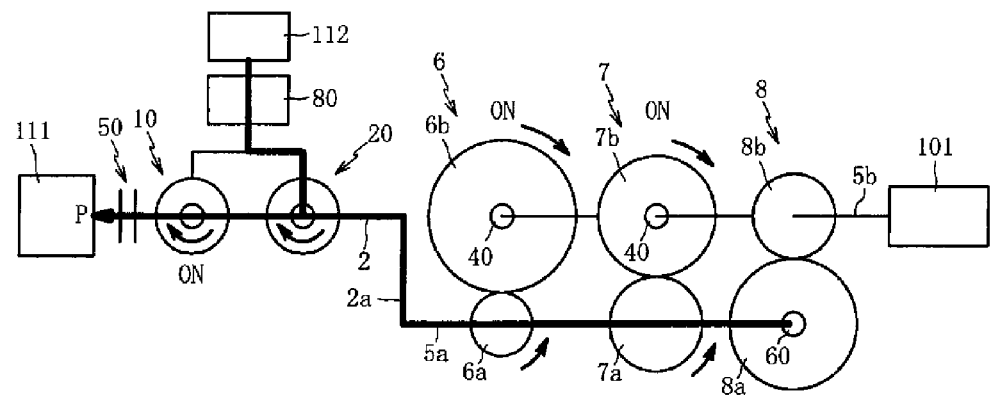
FIG. 7 is a schematic view schematically showing the internal structure of the power transmitting device in starting the engine.

First, the power transmitting device 1 in starting the engine 111 will be described referring to FIG. 7 which schematically shows the internal structure of the power transmitting device 1 in starting the engine 111. In starting the engine 111, the fifth clutch 50 is connected, and the load application device 15 (refer to FIG. 4) of the first clutch 10 and the load application device 15 (refer to FIG. 4) of the fourth clutch 40 are operated (ON). Under this condition, when the generator motor 112 is activated and the rotor 112r is rotated, the power is transmitted to the transmission shaft 3 and the sun gear 80s rotates. Accordingly, the carrier 80c rotates, the first inner ring 11 of the first clutch 10 rotates toward the free direction (the counter-arrow Ri direction of FIG. 5) when viewed from the first outer ring 12 side in relative rotation with respect to the first outer ring 12, and the second inner ring 21 of the second clutch 20 rotates toward the lock direction (the arrow Ri direction of FIG. 6) when viewed from the second outer ring 22 side in relative rotation with respect to the second outer ring 22. Thus, the second sprags 23 engage with the second inner ring 21 and the second outer ring 22 of the second clutch 20, and the power of the carrier 80c is transmitted to the input shaft 2. As a result, the engine 111 is rotated through the fifth clutch 50, and the engine 111 starts.

When the engine 111 starts and the input shaft 2 is driven by the engine 111, the second outer ring 22 of the second clutch 20 rotates toward the free direction (the counter-arrow Ro direction of FIG. 6) when viewed from the second inner ring 21 side in relative rotation with respect to the second inner ring 21. Also, by rotation of the input shaft 2, the first outer ring 12 of the first clutch 10 rotates toward the lock direction (the arrow Ro direction of FIG. 5) when viewed from the first inner ring 11 side in relative rotation with respect to the first inner ring 11, however, because the load application device 15 of the first clutch 10 has been operated, the first inner ring 11 idly rotates inside the first outer ring 12. Accordingly, after the engine 111 starts, the power from the input shaft 2 to the transmission shaft 3 is blocked. When the rotational speed of the engine 111 is increased also, transmission of the power from the input shaft 2 to the transmission shaft 3 is similarly blocked. Accordingly, the generator motor frame does not require the strength sufficient to support high speed rotation of the rotor 112r, and therefore the generator motor 112 can be miniaturized and reduced in weight.

Also, when the power from the input shaft 2 is transmitted to the connecting shaft 5a through the transmission gear pair 2a, the driven gears 6b, 7b of the first gear pairs 6, 7 rotate to rotate the fourth outer ring 42 (refer to FIG. 2) of the fourth clutch 40, and the sixth inner ring 61 (refer to FIG. 2) of the sixth clutch 60 rotates. Although the fourth outer ring 42 of the fourth clutch 40 rotates toward the lock direction (the arrow Ro direction of FIG. 5) when viewed from the fourth inner ring 41 side in relative rotation with respect to the fourth inner ring 41, because the load application device 15 (refer to FIG. 4) of the fourth clutch 40 has been operated, the fourth outer ring 42 makes the fourth inner ring 41 idly rotate. Accordingly, the power is not transmitted to the output shaft 5b. Further, because the sixth inner ring 61 (refer to FIG. 2) of the sixth clutch 60 rotates toward the free direction (the counter-arrow Ri direction of FIG. 5) when viewed from the sixth outer ring 62 side in relative rotation with respect to the sixth outer ring 62, the sixth inner ring 61 makes the sixth outer ring 62 idly rotate. Accordingly, the power is not transmitted to the output shaft 5b. Therefore, transmission of the power to the front wheels 101 in starting the engine 111 can be prevented, and, even when a cell motor (starter) has not been mounted, the power can be transmitted from the input shaft 2 to the engine 111 using the generator motor 112, and the engine 111 can be started. Also, by stopping operation of the load application device 15 (refer to FIG. 4) of the fourth clutch 40 of the first gear pair 6, the fourth sprags 43 engage with the fourth inner ring 41 and the fourth outer ring 42, and the power is transmitted to the output shaft 5b. Accordingly, by simple control of only stopping operation of the load application device 15 of the fourth clutch 40, the time after the start of the engine 111 until transmission of the power to the output shaft 5b can be shortened.

Figure 8:
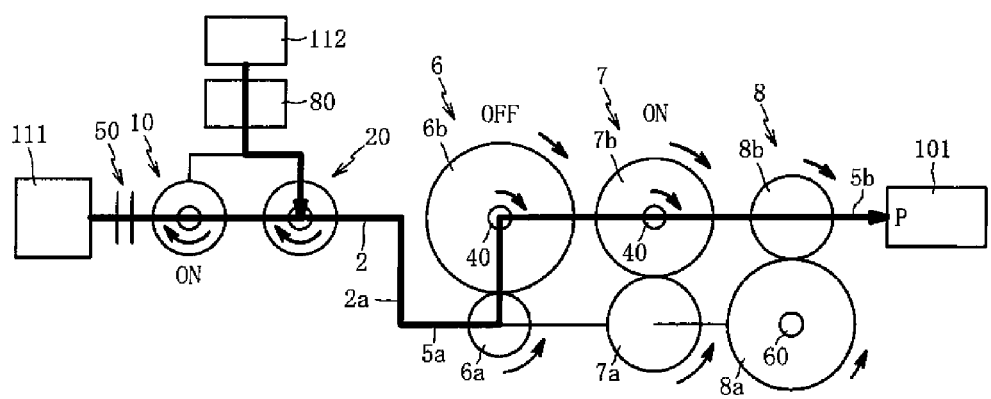
FIG. 8 is a schematic view schematically showing the internal structure of the power transmitting device in travel assisting by the generator motor.

Next, the power transmitting device 1 in travel assisting when the driving force of the engine 111 is assisted by the driving force of the generator motor 112 will be described referring to FIG. 8. FIG. 8 schematically shows the internal structure of the power transmitting device 1 in travel assisting by the generator motor 112. In the travel assisting by the generator motor 112, the fifth clutch 50 maintains the connecting state, and operation of the load application device 15 (refer to FIG. 4) of the first clutch 10 is maintained (ON). Also, the load application device 15 of the fourth clutch of the first gear pair 6 is set to a non-operated state (OFF), and the load application device 15 of the fourth clutch of the first gear pair 7 is operated (ON). Under the condition, when the power from the engine 111 is transmitted to the input shaft 2, the first outer ring 12 (refer to FIG. 2) of the first clutch 10 rotates toward the lock direction (the arrow Ro direction of FIG. 5) when viewed from the first inner ring 11 side in relative rotation with respect to the first inner ring 11. However, because the load application device 15 of the first clutch 10 is in operation, the first outer ring 12 of the first clutch 10 makes the first inner ring 11 of the first clutch 10 idly rotate. Also, in the second clutch 20, because the second outer ring 22 rotates toward the free direction (the counter-arrow Ro direction of FIG. 6) when viewed from the second inner ring 21 side in relative rotation with respect to the second inner ring 21, the second outer ring 22 makes the second inner ring 21 idly rotate. Accordingly, transmission of the power from the input shaft 2 to the generator motor 112 is blocked.

On the other hand, when the generator motor 112 is driven and the power from the rotor 112r is transmitted to the switching device 4, the second inner ring 21 (refer to FIG. 2) of the second clutch 20 rotates toward the lock direction (the arrow Ri direction of FIG. 5) when viewed from the second outer ring 22 side in relative rotation with respect to the second outer ring 22. Accordingly, the power of the engine 111 and the generator motor 112 is transmitted to the input shaft 2.

When the power from the input shaft 2 is transmitted to the connecting shaft 5a through the transmission gear pair 2a, the driven gears 6b, 7b of the first gear pairs 6, 7 rotate, and the fourth outer ring 42 (refer to FIG. 2) of the fourth clutch 40 and the sixth inner ring 61 of the sixth clutch 60 rotate. The fourth outer ring 42 of the fourth clutch 40 rotates toward the lock direction (the arrow Ro direction of FIG. 5) when viewed from the fourth inner ring 41 side in relative rotation with respect to the fourth inner ring 41, however, because the load application device 15 (refer to FIG. 4) of the fourth clutch 40 of the first gear pair 7 has been operated (ON), the fourth outer ring 42 (refer to FIG. 2) of the fourth clutch 40 of the first gear pair 7 makes the fourth inner ring 41 of the fourth clutch 40 idly rotate. In contrast to this, because the load application device 15 of the fourth clutch 40 of the first gear pair 6 is in the non-operated state (OFF), the power is transmitted from the fourth outer ring 42 (refer to FIG. 2) of the fourth clutch 40 of the first gear pair 6 to the fourth inner ring 41, and the output shaft 5b rotates. The rotational speed of the output shaft 5b is $\alpha 1$ which is equal with the rotational speed of the driven gear 6b of the first gear pair 6.

On the other hand, in this case, the driving gear 8a is rotated by the output shaft 5b through the driven gear 8b. In the present embodiment, because the gear ratio (teeth number of driven gear/teeth number of driving gear) k3 of the second gear pair 8 is set to be less than the gear ratio k1 of the first gear pair 6, the rotational speed ($\alpha 1 \cdot k3 = k3/k1 \cdot \alpha$) of the driving gear 8a of the second gear pair 8 becomes less than the rotational speed ($\alpha$) of the input shaft 2. Therefore, in the sixth clutch 60, the rotational speed of the sixth outer ring 62 (refer to FIG. 2) becomes slower than the rotational speed a of the sixth inner ring 61, which is same with the condition in which the sixth outer ring 62 relatively rotates toward the free direction (the counter-arrow Ro direction of FIG. 5). Accordingly, in the sixth clutch 60, the sixth sprags 63 cannot engage with the sixth inner ring 61 and the sixth outer ring 62, and the sixth outer ring 62 makes the sixth inner ring 61 idly rotate. Thus, rotation of the output shaft 5b (rotational speed: $\alpha 1$) is transmitted to the front wheels 101, and the vehicle 100 travels forward.

Also, because the power transmitting device 1 includes the fifth clutch 50 blocking transmission of the power from the engine 111 to the switching device 4, by releasing connection of the fifth clutch 50, the vehicle 100 can travel by the driving force of the generator motor 112 only. Thus, the fuel consumption of the engine 111 can be suppressed. In this case, in order to further suppress the fuel consumption, it is also possible to stop the engine 111 and to stop operation of a valve (not shown) of the engine 111.

Figure 9:
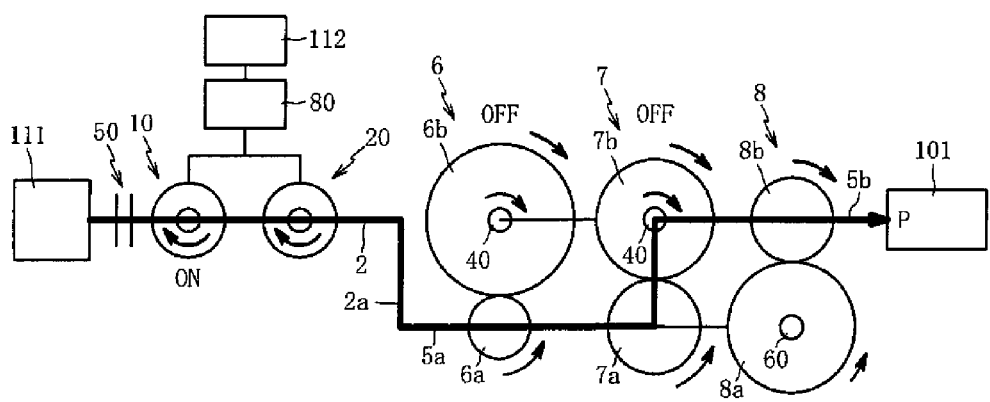
FIG. 9 is a schematic view schematically showing the internal structure of the power transmitting device in high speed traveling when the vehicle travels only by the driving force of the engine.

Next, the power transmitting device 1 in high speed traveling when the vehicle travels by only the driving force of the engine 111 will be described. FIG. 9 schematically shows the internal structure of the power transmitting device 1 in high speed traveling. In the high speed traveling, under the state described in FIG. 8 (the state of travel assisting by the generator motor 112), the generator motor 112 is stopped. Although the first outer ring 12 (refer to FIG. 2) of the first clutch 10 rotates toward the lock direction (the arrow Ro direction of FIG. 5) when viewed from the first inner ring 11 side in relative rotation with respect to the first inner ring 11 by the power transmitted to the input shaft 2 from the engine 111, because the load application device 15 (refer to FIG. 4) of the first clutch 10 is in operation, the first outer ring 12 of the first clutch 10 makes the first inner ring 11 idly rotate. Also, in the second clutch 20, because the second outer ring 22 (refer to FIG. 2) rotates toward the free direction (the counter-arrow Ro direction of FIG. 5) when viewed from the second inner ring 21 side in relative rotation with respect to the second inner ring 21, the second outer ring 22 makes the second inner ring 21 idly rotate. Accordingly, transmission of the power from the input shaft 2 to the generator motor 112 is blocked, and only the power of the engine 111 is transmitted from the input shaft 2 to the change gear 5.

As a result, even when the number of revolution of the input shaft 2 increases by increase of the vehicle speed and increase of the number of revolution of the engine 111, because the rotor 112r is not interlocked, the generator motor 112 does not require the strength sufficient to support high speed rotation of the rotor 112r, and therefore the generator motor 112 can be miniaturized and reduced in weight. Also, because rotation of the rotor 112r in high speed traveling when the vehicle travels by only the driving force of the engine 111 can be prevented, the event that the internal resistance and the inertia of the generator motor 112 become the driving resistance and the energy loss is caused can be prevented, and energy can be utilized effectively.

Also, when shift-up speed change is performed, as shown in FIG. 9, operation of the load application device 15 (refer to FIG. 4) of the fourth clutch 40 of the first gear pair 7 on the high stage side of the first gear pair 6 is stopped (OFF). As a result, similarly to the fourth clutch 40 of the first gear pair 6, the fourth clutch 40 of the first gear pair 7 also becomes the state in which the fourth sprags 43 can engage with the fourth inner ring 41 (refer to FIG. 2) and the fourth outer ring 42.

Here, because the rotational speed α2 of the driven gear 7b of the first gear pair 7 is faster than the rotational speed α1 of the driven gear 6b of the first gear pair 6 (α1<α2), the rotational speed α2 of the driven gear 7b comes to exceed the rotational speed (α1) of the output shaft 5b. Accordingly, in the fourth clutch 40 of the first gear pair 7, the fourth outer ring 42 (refer to FIG. 2) rotates toward the lock direction (the arrow Ro direction of FIG. 5) when viewed from the fourth inner ring 41 side in relative rotation with respect to the fourth inner ring 41. As a result, the power is transmitted from the fourth outer ring 42 toward the fourth inner ring 41, the driven gear 7b rotates with the output shaft 5b, and the output shaft 5b rotates at the rotational speed of α2.

On the other hand, the rotational speed (α1) of the driven gear 6b of the first gear pair 6 becomes slower than the rotational speed (α2) of the output shaft 5b (α1<α2). Accordingly, in the fourth clutch 40 of the first gear pair 6, the rotational speed of the fourth outer ring 42 becomes slower than the rotational speed of the fourth inner ring 41 which is same with the state the fourth inner ring 41 relatively rotates toward the free direction (the counter-arrow Ri direction of FIG. 5). Therefore, in the fourth clutch 40 of the first gear pair 6, the fourth sprags 43 cannot engage with the fourth inner ring 41 and the fourth outer ring 42. As a result, the driven gear 6b makes the output shaft 5b idly rotate, and the power is not transmitted. Also, because the sixth outer ring 62 (refer to FIG. 2) of the sixth clutch 60 rotates toward the free direction (the counter-arrow Ro direction of FIG. 5) when viewed from the sixth inner ring 61 side in relative rotation with respect to the sixth inner ring 61 through the driven gear 8b that is integral with the output shaft 5b, the sixth outer ring 62 makes the sixth inner ring 61 idly rotate, and the power is not transmitted.

Thus, when shift-up speed change is to be performed, the speed change is achieved by only stopping operation of the load application device 15 of the fourth clutch 40 of the first gear pair 7 on the high stage side without any operation on the low stage side (the first gear pair 6 in the present embodiment). Also, in the fourth clutch 40 of the first gear pair 7, by stopping operation of the load application device 15, the fourth sprags 43 tilt toward the self-lock direction, and relative rotation toward a specific direction with respect to the fourth inner ring 41 and the fourth outer ring 42 is restricted instantly. Accordingly, the time required for switching can be shortened, and quick speed change is achieved. Also, because the time required for switching can be shortened, the fourth inner ring 41 and the fourth outer ring 42 do not idly rotate relative to each other during the time from when they are in the state not transmitting the power until when they become the state transmitting the power, and the impact in changing the speed can be prevented.

Further, because the speed change is allowed by only switching operation and non-operation of the load application device 15 of the fourth clutch 40, a complicated meshing mechanism, shift forks and the like are not required, and weight reduction and miniaturization can be achieved. Thus, a number of first gear pairs can be accommodatingly mounted inside a limited space of the change gear 5, and a multi-stage power transmitting device 1 of six-speeds or more for example can be achieved.

Also, in shift-up speed changing, although the traveling speed of the vehicle 100 remains unchanged between before and after the speed change, the gear ratio changes between the gear pairs of the high speed stage and the low speed stage, therefore due to the effect of the internal resistance and the inertia of the engine 111, the number of revolution of the engine 111 drops after the speed change, and the speed change shock occurs. In order to prevent it, it is preferable to change the speed after the number of revolution of the engine 111 is dropped to a number of revolution matching the gear pair of the high speed stage. However, a certain time becomes necessary to drop the number of revolution of the engine 111, and, as a result, there were problems that the shift-up time became long and deceleration feeling was caused.

Figure 10:
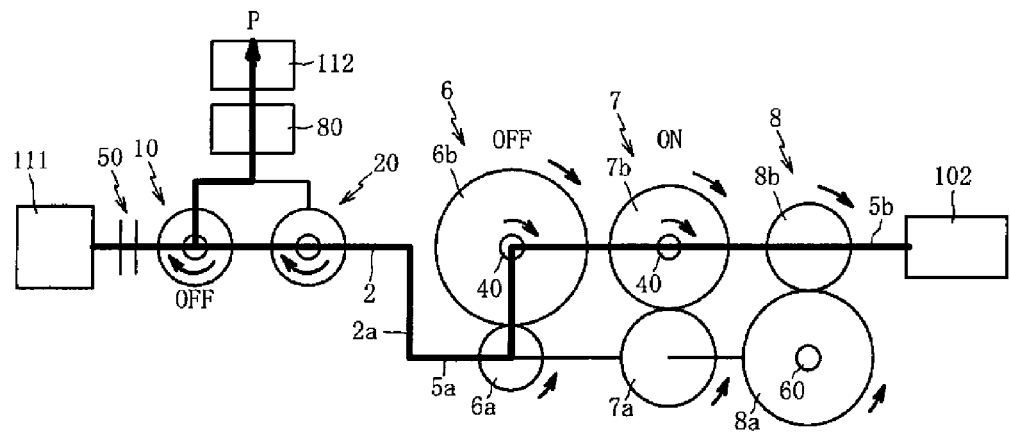
FIG. 10 is a schematic view schematically showing the internal structure of the power transmitting device in shifting up.

On the other hand, the power transmitting device 1 can drop the number of revolution of the engine 111 in a short time in shifting up, and shift-up can be performed in a short time without causing the deceleration feeling. The case the number of revolution of the engine 111 is dropped in shifting up will be described referring to FIG. 10. FIG. 10 is a schematic view schematically showing the internal structure of the power transmitting device 1 in shifting up.

When the shift-up speed change for transmitting the power by the first gear pair 7 is performed in the state where the power is transmitted by the first gear pair 6 and the vehicle is traveling (the load application device of the fourth clutch 40 of the first gear pair 6 is OFF, and the load application device of the fourth clutch 40 of the first gear pair 7 is ON), the load application device 15 (refer to FIG. 2) of the first clutch 10 is set to a non-operated state (OFF) under the state the fifth clutch 50 is connected. As a result, the first outer ring 12 (refer to FIG. 2) of the first clutch 10 rotates toward the lock direction (the arrow Ro direction of FIG. 5) when viewed from the first inner ring 11 side in relative rotation with respect to the first inner ring 11, and, in the second clutch 20, the second outer ring 22 (refer to FIG. 2) rotates toward the free direction (the counter-arrow Ri direction of FIG. 6) when viewed from the second inner ring 21 side in relative rotation with respect to the second inner ring 21. Therefore, the first inner ring 11 of the first clutch 10 rotates with the first outer ring 12. By the rotation of the first outer ring 12, the carrier 80c rotates, and the sun gear 80s meshing with the planetary gear 80p rotates. As a result, the power is transmitted from the sun gear 80s to the transmission shaft 3, the rotor 112r rotates, and thereby the electric power is generated. Because a part of the energy transmitted to the input shaft 2 is used and consumed for rotating the rotor 112r, the number of revolution of the engine 111 connected to the input shaft 2 drops in a short time.

Further, the number of revolution of the connecting shaft 5a connected to the input shaft 2 also drops. Accordingly, the number of revolution of the driven gear 6b meshing with the driving gear 6a drops, and the number of revolution of the fourth outer ring 42 drops. Therefore, in the fourth clutch 40 in the driven gear 6b, the fourth outer ring 42 (refer to FIG. 2) rotates toward the free direction (the counter-arrow Ro direction of FIG. 5) when viewed from the fourth inner ring 41 side in relative rotation with respect to the fourth inner ring 41. As a result, transmission of the power from the fourth outer ring 42 to the fourth inner ring 41 is blocked. Therefore, drop of the number of revolution of the driven gear 6b does not affect the number of revolution of the output shaft 5b, that is the traveling speed of the vehicle 100. Accordingly, the power transmitting device 1 can drop the number of revolution of the input shaft 2a (the number of revolution of the engine 111) without causing a deceleration feeling of the vehicle 100 to a driver and a fellow passenger. Also, as described in FIG. 9, by making the load application device 15 (refer to FIG. 4) of the fourth clutch 40 of the first gear pair 7 a non-operated state (OFF), the shock in shifting up is prevented, and the speed can be changed smoothly in a short time without causing a deceleration feeling. Furthermore, the energy can be utilized effectively, and the electric power generation amount can be increased.

Figure 11:
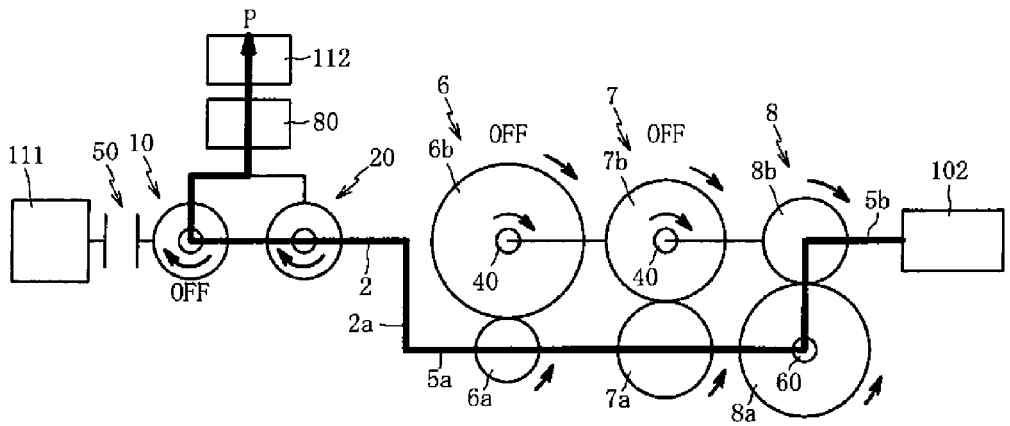
FIG. 11 is a schematic view schematically showing the internal structure of the power transmitting device in regenerating.

Next, the power transmitting device 1 in regenerating performed in coast traveling and braking will be described. FIG. 11 is a schematic view schematically showing the internal structure of the power transmitting device 1 in regenerating. In regenerating, connection of the fifth clutch 50 is released, and the load application device 15 (refer to FIG. 4) of the first clutch 10 is made a non-operated state (OFF). Under the state an accelerator pedal is not operated, as shown in FIG. 11, the power is inputted from the output shaft 5b (the rotational speed: α2) to the power transmitting device 1. As a result, the power is transmitted from the output shaft 5b to the driving gear 8a through the driven gear 8b of the second gear pair 8, and the power is transmitted to the sixth outer ring 62 (refer to FIG. 2) of the sixth clutch 60.

Here, because the gear ratio of the second gear pair 8 is k3 and the rotational speed of the driven gear 8b is α2, the rotational speed of the sixth outer ring 62 which is integral with the driving gear 8a is k3·α2. On the other hand, because the sixth inner ring 61 of the sixth clutch 60 is in the state the driving force from the connecting shaft 5a is not applied, its rotational speed is slower than the rotational speed of the driving gear 8a. As a result, the sixth outer ring 62 rotates toward the lock direction (the arrow Ro direction of FIG. 5) when viewed from the sixth inner ring 61 side in relative rotation with respect to the sixth inner ring 61. When the load application device 15 of the sixth clutch 60 is not operated (OFF), the sixth sprags 63 engage with the sixth outer ring 62 and the sixth inner ring 61. As a result, the power is transmitted from the sixth outer ring 62 of the sixth clutch 60 toward the sixth inner ring 61, and the driving gear 8a rotates with the connecting shaft 5a (rotational speed: k3·α2). Accompanying rotation of the driving gear 8a, the connecting shaft 5a rotates, and the driving gears 6a, 7a of the first gear pairs 6, 7 also rotate (rotational speed: k3·α2).

As a result, the power is transmitted to the driven gears 6b, 7b that mesh with the driving gears 6a, 7a of the first gear pairs 6, 7, and the driven gears 6b, 7b rotate at speeds matching respective gear ratios. The rotational speed β2 of the driven gear 6b is k3/k1·α2, and the rotational speed β2 of the driven gear 7b is k3/k2·α2. Because of the relation k1>k2>k3, both of the rotational speeds β1, β2 of the driven gears 6b, 7b become lower than α2.

On the other hand, because the rotational speed of the output shaft 5b is α2, in the fourth clutch 40 of the first gear pair 7, the fourth inner ring 41 rotates at the speed α2. Therefore, in the fourth clutch 40 of the first gear pair 7, the rotational speed of the fourth inner ring 41 becomes faster than the rotational speed of the fourth outer ring 42 which is a state same with the state the fourth inner ring 41 relatively rotates toward the free direction (the counter-arrow Ri direction of FIG. 5). This happens similarly in the first gear pair 6 also. Therefore, in the fourth clutch 40 of the first gear pairs 6, 7, the fourth sprags 43 cannot engage with the fourth inner ring 41 and the fourth outer ring 42. Accordingly, under the state the load application devices 15 of the fourth clutch 40 of the first gear pairs 6, 7 are not operated (OFF), the power from the output shaft 5b can be transmitted to the connecting shaft 5a.

The power transmitted to the connecting shaft 5a is transmitted to the input shaft 2 through the transmission gear pair 2a. When the power is transmitted to the input shaft 2, the first outer ring 12 (refer to FIG. 2) of the first clutch 10 rotates toward the lock direction (the arrow Ro direction of FIG. 5) when viewed from the first inner ring 11 side in relative rotation with respect to the first inner ring 11, and in the second clutch 20, the second outer ring 22 (refer to FIG. 2) rotates toward the free direction (the counter-arrow Ri direction of FIG. 6) when viewed from the second inner ring 21 side in relative rotation with respect to the second inner ring 21. Therefore, the first inner ring 11 of the first clutch 10 rotates with the first outer ring 12. Accompanying rotation of the first inner ring 11 of the first clutch 10, the carrier 80c rotates, and the sun gear 80s meshing with the planetary gear 80p rotates. As a result, the power is transmitted from the sun gear 80s to the transmission shaft 3, the rotor 112r rotates, and the electric power is generated.

Thus, the generator motor 112 is allowed to function as a power generator by the power inputted from the output shaft 2, and the electric power generated by the generator motor 112 can be regenerated to an electric power source. Also, because the fifth clutch 50 blocking transmission of the power from the engine 111 to the switching device 4 is provided, by separating the engine 111 from the switching device 4 in regenerating, the engine 111 can be prevented from becoming the driving resistance of the generator motor 112, the energy loss can be eliminated, and the regeneration amount can be increased.

Figure 12:
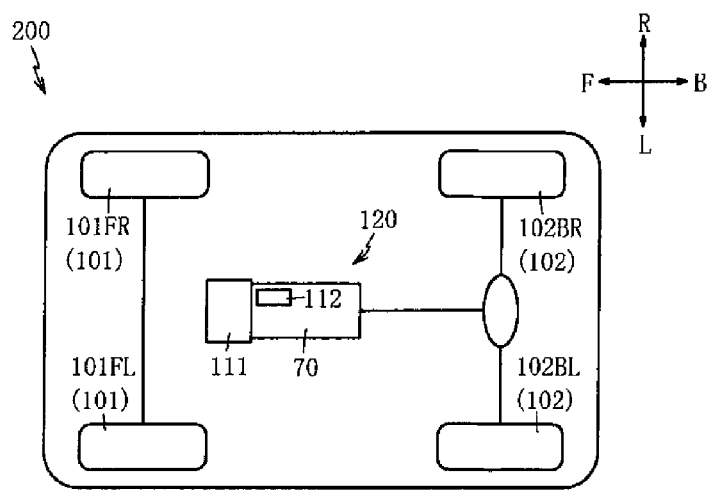
FIG. 12 is a schematic view schematically showing the internal structure of the vehicle mounting the power transmitting device in a second embodiment of the present invention.

Next, a power transmitting device 70 in a second embodiment of the present invention will be described referring to FIG. 12. In the first embodiment, the case in which the power transmitting device was mounted on the front-wheel-drive vehicle 100 was described. On the other hand, in the second embodiment, the power transmitting device 70 is mounted on a rear-wheel-drive vehicle 200. FIG. 12 is a schematic view schematically showing the vehicle 200 mounting the power transmitting device 70 in the second embodiment of the present invention. Also, arrows F-B, L-R of FIG. 12 show the front-rear direction and the left-right direction of the vehicle 200 respectively.

First, the constitution outline of the vehicle 200 will be described. As shown in FIG. 12, the vehicle 200 includes a rear unit 120 driving rear wheels 102 (a left rear wheel 102FL and a right rear wheel 102FR). The rear unit 120 mainly includes the engine 111 and the generator motor 112 as power sources and the power transmitting device 70 transmitting the power of the engine 111 and the generator motor 112 to the rear wheels 102, and is constituted so that the power transmitted to the output shaft 2 of the power transmitting device 70 is transmitted to the right and left rear wheels 102 through a differential device.

Figure 13:
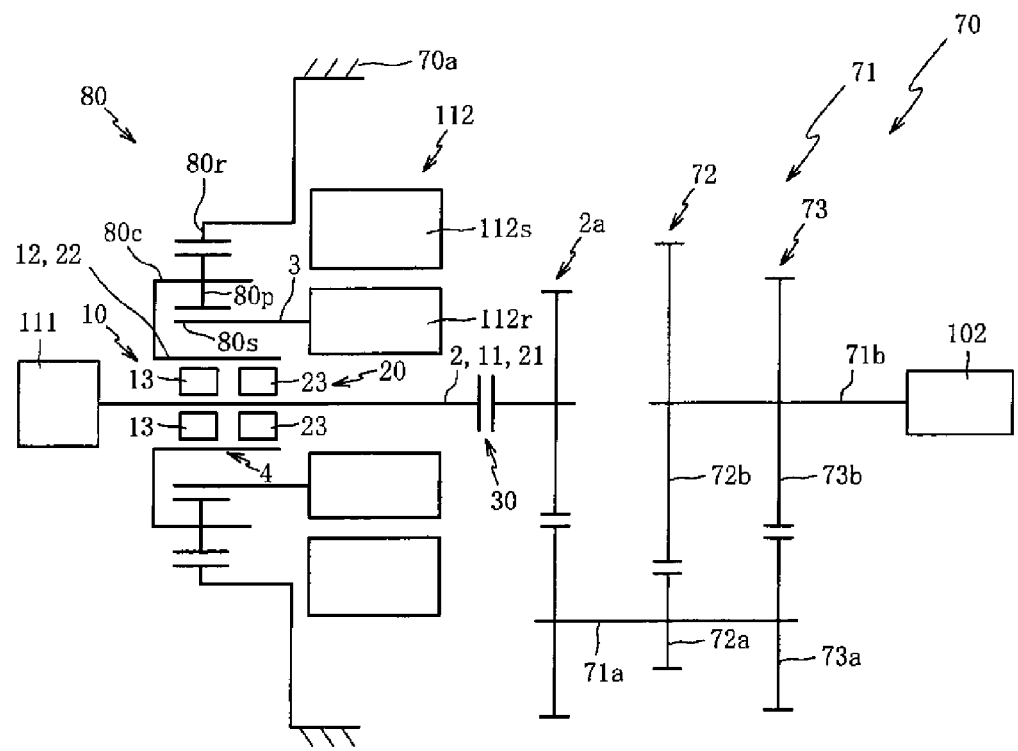
FIG. 13 is a schematic view schematically showing a power transmitting device in the second embodiment.

Next, the power transmitting device 70 in the second embodiment will be described referring to FIG. 13. FIG. 13 is a schematic view schematically showing the internal structure of the power transmitting device 70 in the second embodiment. Below, with respect to a portion same with the corresponding portion of the first embodiment, a same reference numeral is put and description thereof will be omitted. Also, in FIG. 13, in order to facilitate understanding, only the constitutions assuming the function of transmitting the power are illustrated.

Unlike the power transmitting device 1 in the first embodiment, as shown in FIG. 13, in the power transmitting device 70, a third clutch 30 is disposed in the input shaft 2 between the switching device 4 and the transmission gear pair 2a. The third clutch 30 is for blocking transmission of the power from the input shaft 2 to a change gear 71. Also, the power transmitting device 1 in the first embodiment included the change gear 5 having the fourth clutch 40 and the sixth clutch 60, however, the power transmitting device 70 in the second embodiment differs in including the change gear 71 instead of the change gear 5.

Also, in the power transmitting device 1 in the first embodiment, the first inner ring 11 of the first clutch 10 and the second inner ring 21 of the second clutch 20 were connected to the carrier 80c, and the first outer ring 12 of the first clutch 10 and the second outer ring 22 of the second clutch 20 were connected to the input shaft 2. On the other hand, the power transmitting device 70 in the second embodiment differs in that the first inner ring 11 of the first clutch 10 and the second inner ring 21 of the second clutch 20 are connected to the input shaft 2 and that the first outer ring 12 of the first clutch 10 and the second outer ring 22 of the second clutch 20 are connected to the carrier 80c. However, the constitutions themselves of the first clutch 10 and the second clutch 20 are similar, and the first clutch 10 is a clutch blocking transmission of the power from the transmission shaft 3 to the input shaft 2 while blockably transmitting the power inputted from the input shaft 2 to the transmission shaft 3. Also, the second clutch 20 is a clutch transmitting the power inputted from the transmission shaft 3 to the input shaft 2 while blocking transmission of the power from the input shaft 2 to the transmission shaft 3, which are similar to what was described in the first embodiment, and therefore detailed description on the motion of the first clutch 10 and the second clutch 20 will be omitted.

The change gear 71 in the power transmitting device 70 does not include the fourth clutch 40 and the sixth clutch 60, and includes a connecting shaft 71a connected to the input shaft 2 through the transmission gear pair 2a, an output shaft 71b disposed in parallel with the connecting shaft 71a, and plural first gear pairs 72, 73 disposed on the output shaft 71b and the connecting shaft 71a and set to mesh with each other and to make gear ratios different with each other. The first gear pairs 72, 73 include driving gears 72a, 73a disposed on the connecting shaft 71a and driven by the power transmitted from the input shaft 2, and driven gears 72b, 73b disposed on the output shaft 71b and followingly driven by the driving gears 72a, 73a. Also, in the change gear 71, a meshing mechanism, shift forks and the like are omitted in the illustration. Further, the reverse travel stage is also omitted in the illustration. In the reverse travel stage, a pinion gear can be inserted between the first gear pairs 72, 73.

Figure 14:
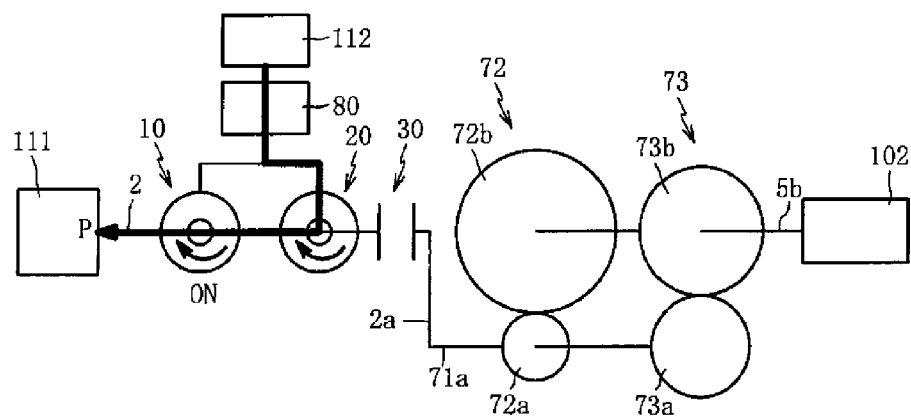
FIG. 14 is a schematic view schematically showing the internal structure of the power transmitting device in starting the engine.
Figure 17:
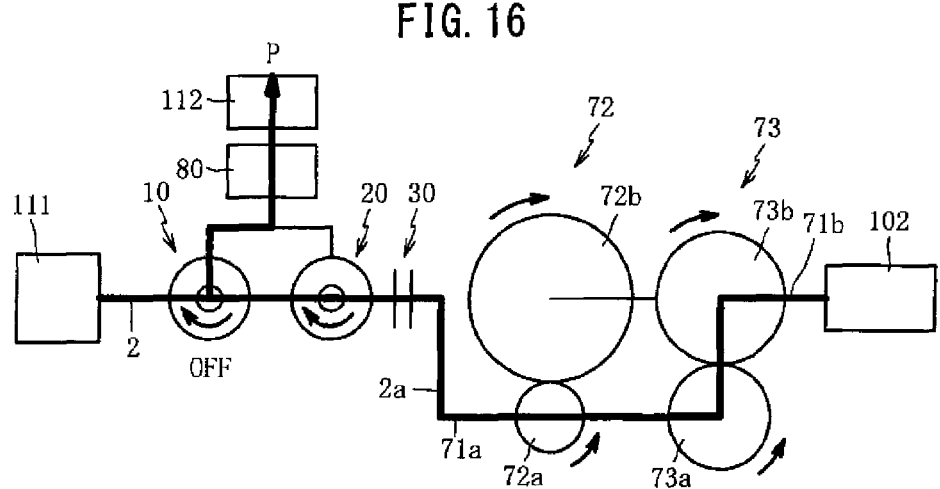
FIG. 17 is a schematic view schematically showing the internal structure of the power transmitting device in regenerating.

Next, the operating state of the power transmitting device 70 in the second embodiment constituted as described above will be described referring to FIG. 14 through to FIG. 17. FIG. 14 through to FIG. 17 schematically show the front views of the internal structure of the power transmitting device 70. Here, in FIG. 14 and FIG. 17, in order to facilitate understanding, the transmission route of the power is shown by an arrow P, and respective rotational directions of the driving gears 72a, 73a, the driven gears 72b, 73b, the first inner ring 11 of the first clutch 10, and the second inner ring 21 of the second clutch 20 are shown in the arrows. Also, the case the load application device 15 (refer to FIG. 4) of the first clutch 10 is operated and engagement of the first sprags 13 with the first inner ring 11 (refer to FIG. 13) and the first outer ring 12 is released is described as "ON", whereas the case the load application device 15 of the first clutch 10 is made a non-operated state and the first sprags 13 can engage with the first inner ring 11 and the first outer ring 12 is described as "OFF".

First, the power transmitting device 70 in starting the engine 111 will be described referring to FIG. 14. FIG. 14 is a schematic view schematically showing the internal structure of the power transmitting device 70 in starting the engine 111. In starting the engine 111, connection of the third clutch 30 is released, and the load application device 15 (refer to FIG. 4) of the first clutch 10 is operated (ON). When the generator motor 112 is operated and the rotor 112r is rotated, the power is transmitted to the switching device 4 through the step-up gear 80, the first outer ring 12 (refer to FIG. 13) of the first clutch 10 rotates toward the free direction (the counter-arrow Ro direction of FIG. 6) when viewed from the first inner ring 11 side in relative rotation with respect to the first inner ring 11, and the second outer ring 22 (refer to FIG. 13) of the second clutch 20 rotates toward the lock direction (the arrow Ro direction of FIG. 5) when viewed from the second inner ring 21 side in relative rotation with respect to the second inner ring 21. Accompanying rotation of the second outer ring 22 of the second clutch 20, the second inner ring 21 rotates. Because connection of the third clutch 30 has been released, the input shaft 2 rotates accompanying the rotation of them. As a result, the engine 111 is rotated, and the engine 111 starts. Accordingly, even when a cell motor (starter) is not mounted, the generator motor 112 can transmit the power to the engine 111 from the input shaft 2 through the second clutch 20, and the engine 111 can be started.

When the engine 111 starts and the input shaft 2 is driven by the engine 111, the second inner ring 21 (refer to FIG. 13) of the second clutch 20 rotates toward the free direction (the counter-arrow Ri direction of FIG. 5) when viewed from the second outer ring 22 side in relative rotation with respect to the second outer ring 22. Also, by rotation of the input shaft 2, the first inner ring 11 of the first clutch 10 rotates toward the lock direction (the arrow Ri direction of FIG. 6) when viewed from the first outer ring 12 side in relative rotation with respect to the first outer ring 12, however, because the load application device 15 of the first clutch 10 has been operated, the first inner ring 11 idly rotates inside the first outer ring 12. Accordingly, after the engine 111 starts, the power from the input shaft 2 to the transmission shaft 3 is blocked. In a similar manner, when the number of revolution of the engine 111 is increased also, transmission of the power from the input shaft 2 to the transmission shaft 3 is blocked. Therefore, because the generator frame does not require the strength sufficient to support high speed rotation of the rotor 112r, the generator motor 112 can be miniaturized and reduced in weight. Also, because transmission of the power from the input shaft 2 to the change gear 71 is blocked by the third clutch 30, vibration of the engine 111 in starting can be made hardly be propagated to a vehicle body.

Here, although it is not illustrated in FIG. 14, connection of the third clutch 30 is released and the load application device 15 (refer to FIG. 4) of the first clutch 10 is made a non-operated state (OFF) under the state the engine 111 is driven. As a result, the first inner ring 11 (refer to FIG. 13) of the first clutch 10 rotates toward the lock direction (the arrow Ri direction of FIG. 6) when viewed from the first outer ring 12 side in relative rotation with respect to the first outer ring 12, and, in the second clutch 20, the second inner ring 21 (refer to FIG. 13) rotates toward the free direction (the counter-arrow Ri direction of FIG. 5) when viewed from the second outer ring 22 side in relative rotation with respect to the second outer ring 22. Therefore, the first outer ring 12 of the first clutch 10 rotates with the first inner ring 11. Accompanying rotation of the first outer ring 12 of the first clutch 10, the carrier 80c rotates and the sun gear 80s meshing with the planetary gear 80P rotates. As a result, the power is transmitted from the sun gear 80s to the transmission shaft 3, the rotor 112r rotates, and the electric power is generated. Thus, by blocking transmission of the power from the input shaft 2 to the change gear 71 by the third clutch 30, all the power from the engine 111 can be transmitted to the rotor 112r, and the electric power can be generated using the generator motor 112.

Figure 15:
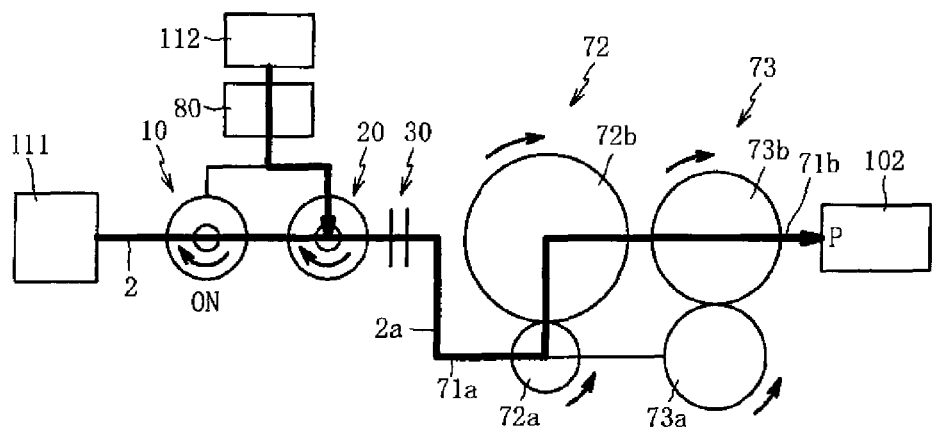
FIG. 15 is a schematic view schematically showing the internal structure of the power transmitting device in travel assisting by the generator motor.

Next, the power transmitting device 70 in travel assisting when the driving force of the engine 111 is assisted by the driving force of the generator motor 112 will be described referring to FIG. 15. FIG. 15 is a schematic view schematically showing the internal structure of the power transmitting device 70 in travel assisting by the generator motor 112. In travel assisting by the generator motor 112, the third clutch 30 is connected, and the operated state of the load application device 15 (refer to FIG. 4) of the first clutch 10 is maintained (ON). When the power from the engine 111 is transmitted to the input shaft 2, the first inner ring 11 (refer to FIG. 13) of the first clutch 10 rotates toward the lock direction (the arrow Ri direction of FIG. 6) when viewed from the first outer ring 12 side in relative rotation with respect to the first outer ring 12.

However, because the load application device 15 of the first clutch 10 has been operated, the first inner ring 11 of the first clutch 10 idly rotates inside the first outer ring 12. Also, in the second clutch 20, because the second inner ring 21 (refer to FIG. 13) rotates toward the free direction (the counter-arrow Ri direction of FIG. 5) when viewed from the second outer ring 22 side in relative rotation with respect to the second outer ring 22, the second inner ring 21 of the second clutch 20 also idly rotates inside the second outer ring 22. Therefore, transmission of the power from the input shaft 2 to the generator motor 112 is blocked.

On the other hand, when the generator motor 112 is driven and the power from the rotor 112r is transmitted to the switching device 4, the first outer ring 12 (refer to FIG. 13) of the first clutch 10 rotates toward the free direction (the counter-arrow Ro direction of FIG. 6) when viewed from the first inner ring 11 side in relative rotation with respect to the first inner ring 11, and the second outer ring 22 (refer to FIG. 13) of the second clutch 20 rotates toward the lock direction (the arrow Ro direction of FIG. 5) when viewed from the second inner ring 21 side in relative rotation with respect to the second inner ring 21. Because relative rotational direction of the first outer ring 12 of the first clutch 10 is the free direction, the first outer ring 12 of the first clutch 10 makes the first inner ring 11 idly rotate. On the other hand, by rotation of the second outer ring 22 of the second clutch 20, the second inner ring 21 rotates, and, accompanying it, the input shaft 2 rotates. Therefore, the power of the engine 111 and the generator motor 112 is transmitted to the input shaft 2. When the power from the input shaft 2 is transmitted to the connecting shaft 71a through the transmission gear pair 2a, the vehicle 100 travels by meshing of the first gear pairs 72, 73 of a desired shift stage in the change gear 71.

Figure 16:
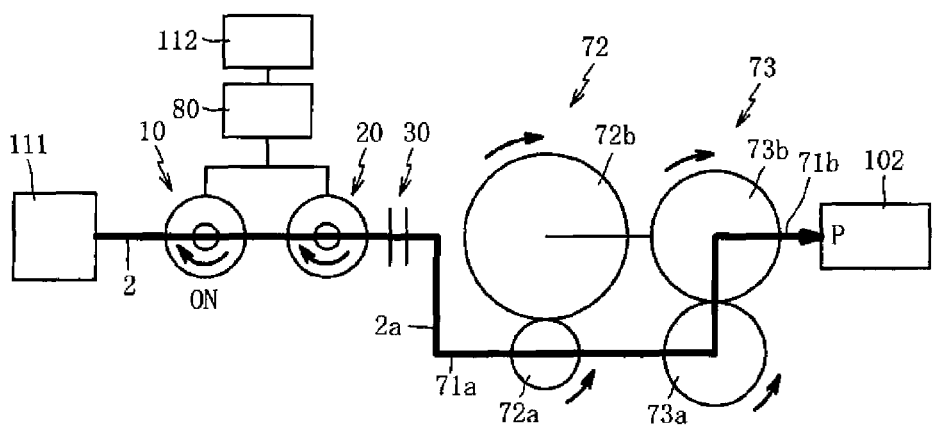
FIG. 16 is a schematic view schematically showing the internal structure of the power transmitting device in high speed traveling when the vehicle travels by only the driving force of the engine.

Next, the power transmitting device 70 in high speed traveling when the vehicle travels by only the driving force of the engine 111 will be described. FIG. 16 is a schematic view schematically showing the internal structure of the power transmitting device 70 in high speed traveling when the vehicle travels by only the driving force of the engine 111. In high speed traveling, under the state described in FIG. 15 (the state of travel assisting by the generator motor 112), the generator motor 112 is stopped. Although the first inner ring 11 (refer to FIG. 13) of the first clutch 10 rotates toward the lock direction (the arrow Ri direction of FIG. 6) when viewed from the first outer ring 12 side in relative rotation with respect to the first outer ring 12 by the power transmitted to the input shaft 2, because the load application device 15 (refer to FIG. 4) of the first clutch 10 has been operated, the first inner ring 11 idly rotates inside the first outer ring 12. Also, in the second clutch 20, because the second inner ring 21 (refer to FIG. 13) rotates toward the free direction (the counter-arrow Ri direction of FIG. 5) when viewed from the second outer ring 22 side in relative rotation with respect to the second outer ring 22, the second inner ring 21 also idly rotates inside the second outer ring 22. Therefore, transmission of the power from the input shaft 2 to the generator motor 112 is blocked, and the power is transmitted from the input shaft 2 to the change gear 71.

As a result, because the generator motor 112 does not require the strength sufficient to support high speed rotation of the rotor 112r, the generator motor 112 can be miniaturized and reduced in weight. Also, because rotation of the rotor 112r in high speed traveling when the vehicle travels by only the driving force of the engine 111 can be prevented, the event that the internal resistance and the inertia of the generator motor 112 become the driving resistance and the energy loss is caused can be prevented, and the energy can be utilized effectively.

Next, the power transmitting device 70 in regenerating will be described. FIG. 17 is a schematic view schematically showing the internal structure of the power transmitting device 70 in regenerating. In regenerating, the third clutch 30 is connected, and the load application device 15 (refer to FIG. 4) of the first clutch 10 is made a non-operated state (OFF). Under the state the accelerator pedal is not operated, the power is transmitted from the output shaft 71b toward the input shaft 2. When the power is transmitted to the input shaft 2, the first inner ring 11 (refer to FIG. 13) of the first clutch 10 rotates toward the lock direction (the arrow Ri direction of FIG. 6) when viewed from the first outer ring 12 side in relative rotation with respect to the first outer ring 12, and, in the second clutch 20, the second inner ring 21 (refer to FIG. 13) rotates toward the free direction (the counter-arrow Ri direction of FIG. 5) when viewed from the second outer ring 22 side in relative rotation with respect to the second outer ring 22 and idly rotates. Therefore, the first outer ring 12 of the first clutch 10 rotates with the first inner ring 11. Accompanying rotation of the first outer ring 12 of the first clutch 10, the carrier 80c of the step-up gear 80 rotates, and the sun gear 80s meshing with the planetary gear 80P rotates. As a result, the power is transmitted from the sun gear 80s to the transmission shaft 3, the rotor 112r rotates, and the electric power is generated.

Figure 18:
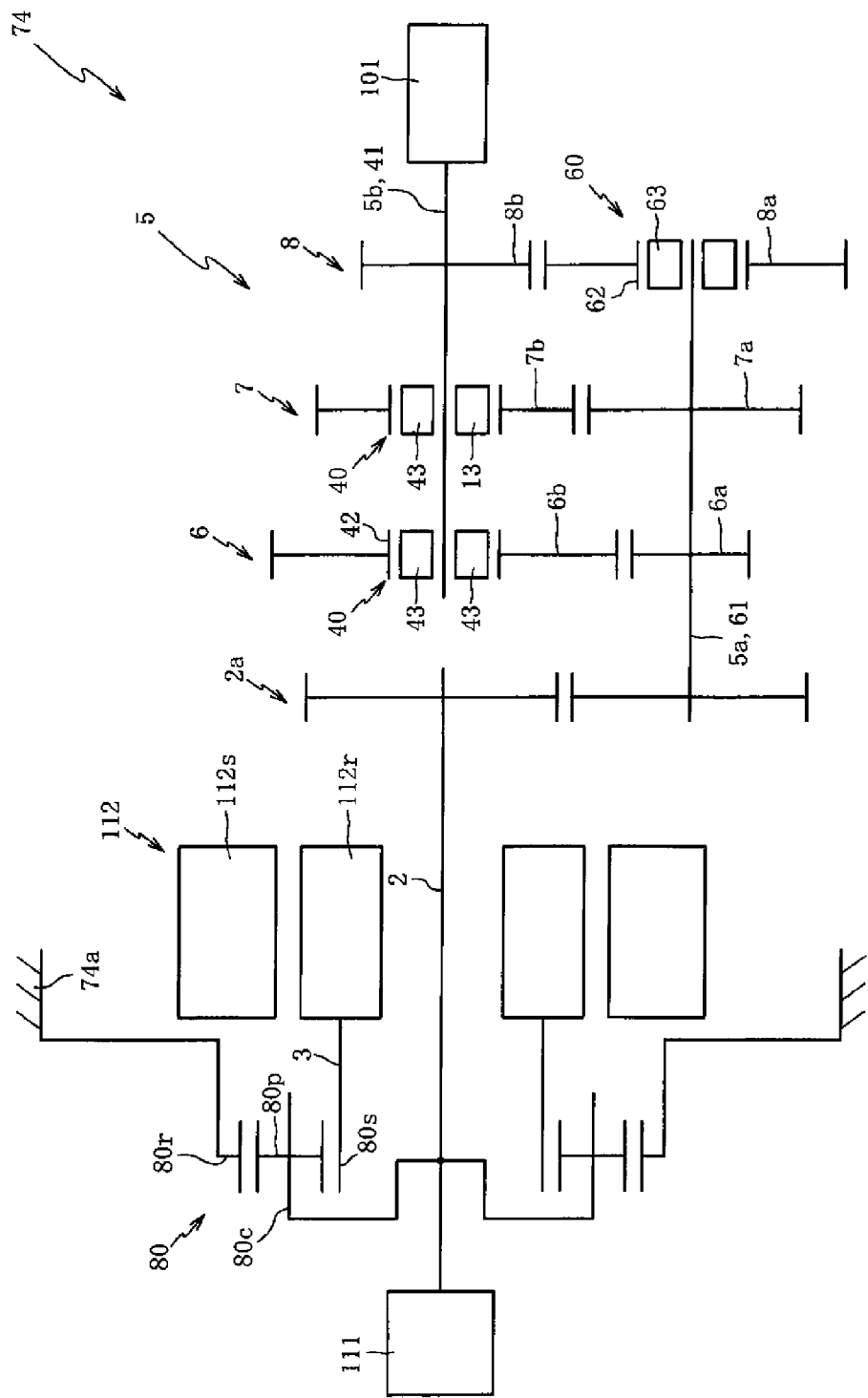
FIG. 18 is a schematic view schematically showing a power transmitting device in a third embodiment.

Next, a power transmitting device 74 in a third embodiment will be described referring to FIG. 18. FIG. 18 is a schematic view schematically showing the power transmitting device 74 in the third embodiment. The power transmitting device 74 is mounted on the front-wheel-drive vehicle 100 described in the first embodiment. The power transmitting device 74 differs from the power transmitting device 1 in the first embodiment in that the switching device 4 and the fifth clutch 50 described in the first embodiment are not provided. Also, with respect to a portion same with the corresponding portion of the first embodiment, a same reference numeral is put, and description thereof will be omitted.

As shown in FIG. 18, in the power transmitting device 74, the carrier 80c of the step-up gear 80 (the ring gear 80r is fixed unrotatably to a case 74a of the power transmitting device 74) is connected to the input shaft 2 not through the switching device 4. In order to start the engine 111, the generator motor 112 is rotated under the state the load application device 15 (refer to FIG. 4) of the fourth clutch 40 has been operated. Because its power is transmitted to the input shaft 2 through the step-up gear 80, the engine 111 is rotated, and the engine 111 can be started. Also, because transmission of the power is blocked in the fourth clutch 40 by operating the load application device 15 (refer to FIG. 4) of the fourth clutch 40, the wheels 101 can be prevented from rotating.

In order to start the vehicle 100, the fourth sprags 43 can be tilted toward the self-lock direction by the energizing force of the ribbon spring 16 by stopping operation of the load application device 15 (refer to FIG. 4) of the fourth clutch 40. As a result, the power is transmitted to the output shaft 5b. Thus, the power from the engine 111 can be transmitted to the output shaft 5b, and the vehicle 100 can be started. Therefore, the processes from the start of the engine till the start of the vehicle 100 can be performed by simple control of switching the load application device 15 of the fourth clutch 40 between operation and non-operation, and the time from the start of the engine till the start of the vehicle 100 can be shortened.

Also, shift-up speed change and shift-down speed change can be performed in a manner similar to that in the first embodiment. Also, in coast traveling and braking, regeneration can be performed also in a manner similarly to that in the first embodiment. Because the motion of the power transmitting device 74 in these cases is similar to that described in the first embodiment, description will be omitted. The power transmitting device 74 can achieve respective functions of starting the engine 111, starting the vehicle 100, speed changing, and regenerating by a simplified structure not provided with the switching device 4. Also, the power transmitting device 74 may possibly be mounted on a rear-wheel-drive vehicle 200.

The present invention was described as above based on the embodiments, however the present invention is not limited to the embodiments by any means, and it can be easily surmised that a variety of improvements and alterations are possible within the range not departing from the purpose of the present invention.

In the respective embodiments, the case in which the load application device 15 (the actuator 15a) was constituted by the motor (AC motor or DC motor) was described, however, it is not necessarily limited to this, and other power sources can rightly be adopted. As the other power sources, for example, a DC motor, hydraulic motor, pneumatic cylinder, hydraulic cylinder, AC solenoid, DC solenoid and the like can be similarly applied.

Here, when the actuator 15a is constituted by the solenoid, the case is not limited to apply the load to the sprags 13 by a gear mechanism and the like, but, for example, the constitution of applying the load to the sprags 13 utilizing an electromagnetic force is also possible.

In the first embodiment, the case the fourth clutch 40 was arranged on the output shaft 5b and the sixth clutch 60 was arranged on the connecting shaft 5a was described, however, the first embodiment is not necessarily limited to this, and the fourth clutch 40 can be rightly arranged in either of the output shaft 5b and the connecting shaft 5a.

In the respective embodiments, the case the step-up gear 80 was constituted by a planetary gear device was described, however, it is not necessarily limited to this, and a gear device other than the planetary gear device can be rightly used.

In the respective embodiments, the case in which the first clutch 10 was constituted so as to include a sprag type one-way clutch with the function of releasing the first sprags 13 was described, however, it is not necessarily limited to this. As far as the power is transmitted to a specific direction and the function of blocking transmission of the power is provided, other clutches can be used. As the other clutches, a clutch transmitting the power by rollers and the like can be similarly applied.

Although the power transmitting device 1 in the first embodiment does not include the third clutch 30 disposed on the power transmission route from the switching device 4 to the change gear 5, as described in the second embodiment, it is possible to arrange the third clutch 30 on the input shaft 2. By providing the third clutch 30, transmission of the power from the engine 111 to the change gear 71 can be blocked, the vibration of the engine 111 in starting can be made hardly be propagated to the vehicle body, and the comfortability can be improved.

Although the description was omitted in the first embodiment, it is also possible that the load application device 15 of the fourth clutch 40 of the first gear pair 6 on the low stage side is operated after the shift-up speed change is performed and engagement of the fourth sprags 43 with the fourth inner ring 41 and the fourth outer ring 42 is forcibly released.

In the second embodiment, the case in which the change gear 71 included a gear type speed change mechanism was described, however, it is not necessarily limited to this, and other change gears can be used. As the other change gears, for example, a continuously variable change gear of a belt type and the like, a manual change gear and the like can be similarly applied.

REFERENCE SIGNS LIST 1, 70, 74 Power transmitting device
2 Input shaft
3 Transmission shaft
4 Switching device
5, 71 Change gear 5a, 71a Connecting shaft
5b, 71b Output shaft
6, 7, 72, 73 First gear pair
8 Second gear pair
10 First clutch
11 First inner ring (inner ring)
11a Outer peripheral surface
12 First outer ring (outer ring)
12a Inner peripheral surface
13 First sprags (sprags)
13a, 13b Engaging surface
14 Retainer
15 Load application device
16 Ribbon spring (energizing member)
20 Second clutch
30 Third clutch
40 Fourth clutch
41 Fourth inner ring (inner ring)
42 Fourth outer ring (outer ring)
43 Fourth sprags (sprags)
50 Fifth clutch
80 Step-up gear
111 Engine
112 Generator motor
112r Rotor
A, B Contact point
O Axis

The invention claimed is:

1. A power transmitting device, comprising:
an input shaft transmitting power from an engine to a change gear;
a transmission shaft transmitting power transmitted from the input shaft to a rotor of a generator motor; and
a switching device disposed on a power transmission route from the input shaft to the transmission shaft and switching transmitting direction of power between the input shaft and the transmission shaft,
wherein the switching device includes:
   a first clutch blocking transmission of power from the transmission shaft to the input shaft while transmitting power inputted from the input shaft to the transmission shaft, where the power transmission from the input shaft to the transmission shaft can be blocked; and
   a second clutch transmitting power inputted from the transmission shaft to the input shaft while blocking transmission of power from the input shaft to the transmission shaft;
wherein the first clutch transmits power by means of sprag that is retained by a retainer;
wherein a load application device is provided having a motor which operates to tilt the sprag of the first clutch toward a counter-self-lock direction; and
wherein the retainer for the first clutch comprises a retaining part that retains the sprag, and a retainer load transmitting part that is installed to extend toward a direction crossing the axis from the retaining part where the retainer load transmitting part transmits a load from the load application device via a gear mechanism.

2. The power transmitting device as set forth in claim 1 further comprising a step-up gear disposed on a power transmission route from the switching device to the rotor and increasing rotational speed of the rotor by rotation of the input shaft.

3. The power transmitting device as set forth in claim 1 further comprising a third clutch disposed on a power transmission route from the switching device to the change gear and blocking transmission of power from the engine to the change gear.

4. The power transmitting device as set forth in claim 3, further comprising:
a change gear to which power is transmitted from the input shaft,
wherein the change gear includes:
   a connecting shaft connected to the input shaft and inputted with power from the engine;
   an output shaft disposed in parallel with the connecting shaft;
   a plurality of first gear pairs disposed on the output shaft and the connecting shaft and set so as to engage with each other and to make different gear ratios; and
   fourth clutches disposed on either one gear of the respective first gear pairs and blocking transmission of power from the output shaft to the connecting shaft while transmitting power inputted from the connecting shaft to the output shaft, where the power transmission can be blocked,
wherein the fourth clutch includes:
   an inner ring having an outer peripheral surface with a circular cross-sectional shape, constituted so as to rotate around an axis, and connected to the connecting shaft, the output shaft, or a gear of the first gear pair;
   an outer ring having an inner peripheral surface with a circular cross-sectional shape opposing the outer peripheral surface of the inner ring, constituted so as to rotate around the axis, and connected to a gear of the first gear pair, the connecting shaft, or the output shaft;
   sprags having engaging surfaces contacting the inner peripheral surface of the outer ring and the outer peripheral surface of the inner ring respectively, and disposed in a plurality of numbers in the peripheral direction between the opposing outer peripheral surface of the inner ring and the inner peripheral surface of the outer ring;
   a retainer retaining the sprags so as to tilt toward a peripheral direction of the outer peripheral surface of the inner ring and the inner peripheral surface of the outer ring;
   an energizing member applying an energizing force to the sprags and tilting the sprags toward a self-lock direction in a peripheral direction so that the engaging surfaces of the sprags contact the outer peripheral surface of the inner ring and the inner peripheral surface of the outer ring; and
   a load application device applying a load to the sprags through the retainer resisting the energizing force of the energizing member and tilting the sprags toward a counter-self-lock direction in the peripheral direction which is a direction opposite to the self-lock direction.

5. The power transmitting device as set forth in claim 3 further comprising a fifth clutch disposed on a power transmission route from the engine to the switching device and blocking transmission of power from the engine to the switching device.

6. The power transmitting device as set forth in claim 3 further comprising a step-up gear disposed on a power transmission route from the switching device to the rotor and increasing rotational speed of the rotor by rotation of the input shaft.

7. The power transmitting device as set forth in claim 1, further comprising:

a change gear to which power is transmitted from the input shaft, wherein the change gear includes:
- a connecting shaft connected to the input shaft and inputted with power from the engine;
- an output shaft disposed in parallel with the connecting shaft;
- a plurality of first gear pairs disposed on the output shaft and the connecting shaft and set so as to engage with each other and to make different gear ratios; and
- fourth clutches disposed on either one gear of the respective first gear pairs and blocking transmission of power from the output shaft to the connecting shaft while transmitting power inputted from the connecting shaft to the output shaft, where the power transmission can be blocked, wherein the fourth clutch includes:
- an inner ring having an outer peripheral surface with a circular cross-sectional shape, constituted so as to rotate around an axis, and connected to the connecting shaft, the output shaft, or a gear of the first gear pair;
- an outer ring having an inner peripheral surface with a circular cross-sectional shape opposing the outer peripheral surface of the inner ring, constituted so as to rotate around the axis, and connected to a gear of the first gear pair, the connecting shaft, or the output shaft;
- sprags having engaging surfaces contacting the inner peripheral surface of the outer ring and the outer peripheral surface of the inner ring respectively, and disposed in a plurality of numbers in the peripheral direction between the opposing outer peripheral surface of the inner ring and the inner peripheral surface of the outer ring;
- a retainer retaining the sprags so as to tilt toward a peripheral direction of the outer peripheral surface of the inner ring and the inner peripheral surface of the outer ring;
- an energizing member applying an energizing force to the sprags and tilting the sprags toward a self-lock direction in a peripheral direction so that the engaging surfaces of the sprags contact the outer peripheral surface of the inner ring and the inner peripheral surface of the outer ring; and
- a load application device applying a load to the sprags through the retainer resisting the energizing force of the energizing member and tilting the sprags toward a counter-self-lock direction in the peripheral direction which is a direction opposite to the self-lock direction.

8. The power transmitting device as set forth in claim 7, wherein the change gear is connected to the switching device not through a clutch.

9. The power transmitting device as set forth in claim 8 further comprising a step-up gear disposed on a power transmission route from the switching device to the rotor and increasing rotational speed of the rotor by rotation of the input shaft.

10. The power transmitting device as set forth in claim 7 further comprising a fifth clutch disposed on a power transmission route from the engine to the switching device and blocking transmission of power from the engine to the switching device.

11. The power transmitting device as set forth in claim 7 further comprising a step-up gear disposed on a power transmission route from the switching device to the rotor and increasing rotational speed of the rotor by rotation of the input shaft.

12. The power transmitting device as set forth in claim 1 further comprising a fifth clutch disposed on a power transmission route from the engine to the switching device and blocking transmission of power from the engine to the switching device.

13. The power transmitting device as set forth in claim 12, wherein the change gear is connected to the switching device not through a clutch.

14. The power transmitting device as set forth in claim 12 further comprising a step-up gear disposed on a power transmission route from the switching device to the rotor and increasing rotational speed of the rotor by rotation of the input shaft.

* * * * *